(12) United States Patent
Pezeshki et al.

(10) Patent No.: US 12,143,196 B2
(45) Date of Patent: Nov. 12, 2024

(54) RELATIVE BEAM DIRECTION INDICATION FOR BEAM MANAGEMENT

(71) Applicant: QUALCOMM Incorporated, San Diego, CA (US)

(72) Inventors: Hamed Pezeshki, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 17/485,135

(22) Filed: Sep. 24, 2021

(65) Prior Publication Data
US 2023/0101994 A1    Mar. 30, 2023

(51) Int. Cl.
*H04B 7/08*     (2006.01)
*H04B 7/0408*   (2017.01)
*H04L 5/00*     (2006.01)
*H04W 72/044*   (2023.01)

(52) U.S. Cl.
CPC .......... *H04B 7/088* (2013.01); *H04B 7/0408* (2013.01); *H04L 5/0048* (2013.01); *H04W 72/046* (2013.01)

(58) Field of Classification Search
CPC .... H04B 7/088; H04B 7/0408; H04B 7/0695; H04L 5/0048; H04W 72/046
See application file for complete search history.

(56) References Cited

U.S. PATENT DOCUMENTS

| | | | |
|---|---|---|---|
| 2016/0241322 A1* | 8/2016 | Son | H04B 7/0617 |
| 2017/0303263 A1* | 10/2017 | Islam | H04L 5/0048 |
| 2018/0081355 A1* | 3/2018 | Magy | H04K 3/65 |
| 2018/0115994 A1* | 4/2018 | Islam | H04B 7/0695 |
| 2020/0235961 A1* | 7/2020 | Kim | H04L 5/0051 |
| 2021/0175953 A1* | 6/2021 | Nilsson | H04B 7/0632 |
| 2021/0258977 A1* | 8/2021 | Stephenne | H04W 72/044 |
| 2022/0345186 A1* | 10/2022 | Zhang | H04B 7/0408 |
| 2023/0008786 A1* | 1/2023 | Karjalainen | H04W 8/005 |

(Continued)

FOREIGN PATENT DOCUMENTS

WO    WO-2021104680 A1    6/2021

OTHER PUBLICATIONS

International Search Report and Written Opinion—PCT/US2022/041915—ISA/EPO—Nov. 17, 2022 (2105272WO).

*Primary Examiner* — Ajit Patel
*Assistant Examiner* — Wilfred Thomas
(74) *Attorney, Agent, or Firm* — Holland & Hart LLP/Qualcomm Incorporated

(57) ABSTRACT

Methods, systems, and devices for wireless communications are described. The method may involve a receiving device selecting a receive beam for receiving a signal from a transmitting device based on a relative direction of the transmit beam used to transmit the signal. A first wireless device may receive, from a second wireless device, an indication of a first angular range. The first angular range may be associated with a set of transmit beams for the second wireless device and correspond to at least two transmit beams of the set of transmit beams. The first wireless device may select a receive beam from a set of receive beams based on the first angular range and receive a reference signal, from the second wireless device, using the selected receive beam. The first device may also transmit channel information, to second wireless device, based on the reference signal.

30 Claims, 16 Drawing Sheets

(56) References Cited

U.S. PATENT DOCUMENTS

| | | | |
|---|---|---|---|
| 2023/0012726 A1* | 1/2023 | Karjalainen | H04B 7/06954 |
| 2023/0084028 A1* | 3/2023 | Karimidehkordi | H04W 72/046 |
| | | | 370/216 |
| 2023/0189012 A1* | 6/2023 | Niu | H04W 4/44 |
| | | | 455/446 |
| 2023/0353204 A1* | 11/2023 | Petersson | H04B 7/10 |

* cited by examiner

Relative Direction Indication 220

RELATIVE BEAM DIRECTION INDICATION FOR BEAM MANAGEMENT

FIELD OF TECHNOLOGY

The following relates to wireless communications, including relative beam direction indication for beam management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE and a base station may undergo a beam management procedure to determine a receive/transmit beam pair for subsequent communications between the two. During the beam management procedure, the base station may transmit a series of signals to the UE using a set of directional transmit beams and the UE may receive the series of signals from the base station using a set of directional receive beams. The UE may measure a signal strength of each signals in the series and select a directional receive beam whose associated reference signal has the highest signal strength. In addition, during the beam management procedure, the UE may also estimate the channel by performing beamformed channel measurements for all possible beam pairs between the UE and the base station.

SUMMARY

The described techniques relate to improved methods, systems, devices, and apparatuses that support relative beam direction indication for beam management. Generally, the described techniques provide for a receiving device to determine a directional beam via which to receive a signal from a transmitting device based on a relative direction indication associated with a directional beam used by the transmitting device to transmit the signal. The transmitting device may transmit a relative direction indication to the receiving device, where the relative direction may correspond to two or more possible transmit beams. In some cases, the relative direction indication may indicate an angular range (e.g., a range of azimuth angles, a range of elevation angles, or any combination thereof) relative to an antenna panel of the transmitting device, where two or more transmit beams associated with the transmitting device have directions that are within the indicated angular range.

Thus, the receiving device may be able to determine, based on the relative direction indication, an approximate direction of a transmit beam to be used by the transmitting device. The receiving device may select a receive beam from a set of receive beams based on the relative direction indication. The transmitting device may transmit a reference signal to the receiving device using one of the transmit beams corresponding to the indicated relative direction (e.g., having a direction relative to the antenna panel of the transmitting device that falls within the angular range corresponding to the indicated relative direction), and the receiving device may receive the reference signal using the selected receive beam.

The methods as described herein may allow a receiving device to decrease the amount of candidate receive beams and beam pairs that the receiving device uses for reference signal measurement during a beam management (e.g., beam selection) procedure, thereby decreasing signaling overhead, processing overhead, or both. In addition, the methods as described herein may allow a receiving device to determine receive beams of interest based on the relative directions indicated for different reference signals. The receiving device may perform beamformed channel measurements based on receiving the reference signals via the receive beams of interest.

And in some cases, the receiving device may also estimate the raw (e.g., non-beamformed) channel for communications between the receiving device and the transmitting device based on the beamformed channel measurement for the beam pairs of interest. By doing so, the receiving device may avoid performing channel measurement for all possible beam pairs, thereby decreasing power consumption at the receiving device related to performing beamformed channel measurements for all possible beam pairs, along with related signaling overhead.

A method for wireless communication at a first wireless device is described. The method may include receiving, from a second wireless device, signaling indicating a first angular range of a set of angular ranges, where the set of angular ranges is associated with a set of transmit beams for the second wireless device, and where the first angular range corresponds to at least two transmit beams of the set of transmit beams, selecting, from among a set of receive beams for the first wireless device, a receive beam based on the first angular range, receiving, from the second wireless device, a reference signal using the selected receive beam as part of a beam management procedure, and transmitting, to the second wireless device, beam information based on the reference signal.

An apparatus for wireless communication at a first wireless device is described. The apparatus may include a processor, memory coupled with the processor, and instructions stored in the memory. The instructions may be executable by the processor to cause the apparatus to receive, from a second wireless device, signaling indicating a first angular range of a set of angular ranges, where the set of angular ranges is associated with a set of transmit beams for the second wireless device, and where the first angular range corresponds to at least two transmit beams of the set of transmit beams, select, from among a set of receive beams for the first wireless device, a receive beam based on the first angular range, receive, from the second wireless device, a reference signal using the selected receive beam as part of a beam management procedure, and transmit, to the second wireless device, beam information based on the reference signal.

Another apparatus for wireless communication at a first wireless device is described. The apparatus may include means for receiving, from a second wireless device, signaling indicating a first angular range of a set of angular ranges, where the set of angular ranges is associated with a set of transmit beams for the second wireless device, and where the first angular range corresponds to at least two transmit beams of the set of transmit beams, means for selecting, from among a set of receive beams for the first wireless device, a receive beam based on the first angular range, means for receiving, from the second wireless device, a reference signal using the selected receive beam as part of a beam management procedure, and means for transmitting, to the second wireless device, beam information based on the reference signal.

A non-transitory computer-readable medium storing code for wireless communication at a first wireless device is described. The code may include instructions executable by a processor to receive, from a second wireless device, signaling indicating a first angular range of a set of angular ranges, where the set of angular ranges is associated with a set of transmit beams for the second wireless device, and where the first angular range corresponds to at least two transmit beams of the set of transmit beams, select, from among a set of receive beams for the first wireless device, a receive beam based on the first angular range, receive, from the second wireless device, a reference signal using the selected receive beam as part of a beam management procedure, and transmit, to the second wireless device, beam information based on the reference signal.

In some examples of the method, apparatuses, and non-transitory computer-readable medium described herein, the set of angular ranges spans a range of azimuth angles relative to an antenna panel of the second wireless device, a respective range of elevation angles relative to the antenna panel of the second wireless device, or both and each angular range of the set of angular ranges spans a respective portion of the range of azimuth angles, a respective portion of the range of elevation angles, or both.

In some examples of the method, apparatuses, and non-transitory computer-readable medium described herein, receiving the signaling indicating the first angular range may include operations, features, means, or instructions for receiving a single indication that maps to a respective range of azimuth angles relative to an antenna panel of the second wireless device and to a respective range of elevation angles relative to the antenna panel of the second wireless device.

In some examples of the method, apparatuses, and non-transitory computer-readable medium described herein, receiving the signaling indicating the first angular range may include operations, features, means, or instructions for receiving a first indication that maps to a respective range of azimuth angles relative to an antenna panel of the second wireless device and receiving a second indication that maps to a respective range of elevation angles relative to the antenna panel of the second wireless device.

Some examples of the method, apparatuses, and non-transitory computer-readable medium described herein may further include operations, features, means, or instructions for receiving, from the second wireless device and prior to the receiving the signaling indicating the first angular range, a set of reference signals using the set of receive beams and determining, based on the set of reference signals, that a second receive beam of the set of receive beams may be associated with a signal strength above a threshold for a second angular range of the set of angular ranges, where selecting the receive beam may be based on a first relationship between the selected receive beam and the second receive beam and a second relationship between the first angular range and the second angular range.

Some examples of the method, apparatuses, and non-transitory computer-readable medium described herein may further include operations, features, means, or instructions for determining channel information that may be independent of each receive beam of the set of receive beams and each transmit beam of the set of transmit beams based on the reference signal and one or more additional reference signals received via one or more additional receive beams of the set of receive beams, where transmitting the beam information includes transmitting the channel information that may be independent of each receive beam of the set of receive beams and each transmit beam of the set of transmit beams.

Some examples of the method, apparatuses, and non-transitory computer-readable medium described herein may further include operations, features, means, or instructions for determining channel information specific to a beam pair including the selected receive beam and a transmit beam of the set of transmit beams based on the reference signal, where transmitting the beam information includes transmitting the channel information specific to the beam pair.

Some examples of the method, apparatuses, and non-transitory computer-readable medium described herein may further include operations, features, means, or instructions for receiving, from the second wireless device and prior to the receiving the signaling indicating the first angular range, a set of reference signals using at least a subset of the set of receive beams and determining, for a first location of the first wireless device associated with receiving the set of reference signals, an orientation of the first wireless device relative to the second wireless device, where selecting the receive beam may be based on a relationship between the first location and a second location of the first wireless device associated with receiving the reference signal.

In some examples of the method, apparatuses, and non-transitory computer-readable medium described herein, the second wireless device includes a base station and the reference signal includes a channel state information reference signal (CSI-RS), one or more signals of a synchronization signal block (SSB), or any combination thereof.

In some examples of the method, apparatuses, and non-transitory computer-readable medium described herein, receiving the signaling indicating the first angular range may include operations, features, means, or instructions for receiving downlink control information (DCI), a medium access control-control element (MAC-CE), radio resource control (RRC) signaling, or any combination thereof that indicates the first angular range.

In some examples of the method, apparatuses, and non-transitory computer-readable medium described herein, the second wireless device includes a user equipment (UE) and the reference signal includes a sounding reference signal (SRS).

In some examples of the method, apparatuses, and non-transitory computer-readable medium described herein, receiving the signaling indicating the first angular range may include operations, features, means, or instructions for receiving uplink control information (UCI), a MAC-CE, RRC signaling, or any combination thereof that indicates the first angular range.

A method for wireless communication at a second wireless device is described. The method may include transmitting, to a first wireless device, signaling a first angular range of a set of angular ranges, where the set of angular ranges is associated with a set of transmit beams for the second wireless device, and where the first angular range corresponds to at least two transmit beams of the set of transmit beams, transmitting, to the first wireless device, a reference signal using a transmit beam of the at least two transmit beams as part of a beam management procedure, and receiving, from the second wireless device, beam information based on the reference signal.

An apparatus for wireless communication at a second wireless device is described. The apparatus may include a processor, memory coupled with the processor, and instructions stored in the memory. The instructions may be executable by the processor to cause the apparatus to transmit, to a first wireless device, signaling a first angular range of a set of angular ranges, where the set of angular ranges is associated with a set of transmit beams for the second wireless device, and where the first angular range corresponds to at least two transmit beams of the set of transmit beams, transmit, to the first wireless device, a reference signal using a transmit beam of the at least two transmit beams as part of a beam management procedure, and receive, from the second wireless device, beam information based on the reference signal.

Another apparatus for wireless communication at a second wireless device is described. The apparatus may include means for transmitting, to a first wireless device, signaling a first angular range of a set of angular ranges, where the set of angular ranges is associated with a set of transmit beams for the second wireless device, and where the first angular range corresponds to at least two transmit beams of the set of transmit beams, means for transmitting, to the first wireless device, a reference signal using a transmit beam of the at least two transmit beams as part of a beam management procedure, and means for receiving, from the second wireless device, beam information based on the reference signal.

A non-transitory computer-readable medium storing code for wireless communication at a second wireless device is described. The code may include instructions executable by a processor to transmit, to a first wireless device, signaling a first angular range of a set of angular ranges, where the set of angular ranges is associated with a set of transmit beams for the second wireless device, and where the first angular range corresponds to at least two transmit beams of the set of transmit beams, transmit, to the first wireless device, a reference signal using a transmit beam of the at least two transmit beams as part of a beam management procedure, and receive, from the second wireless device, beam information based on the reference signal.

In some examples of the method, apparatuses, and non-transitory computer-readable medium described herein, the set of angular ranges spans a range of azimuth angles relative to an antenna panel of the second wireless device, a respective range of elevation angles relative to the antenna panel of the second wireless device, or both and each angular range of the set of angular ranges spans a respective portion of the range of azimuth angles, a respective portion of the range of elevation angles, or both.

In some examples of the method, apparatuses, and non-transitory computer-readable medium described herein, transmitting the signaling indicating the first angular range may include operations, features, means, or instructions for transmitting a single indication that maps to a respective range of azimuth angles relative to an antenna panel of the second wireless device and to a respective range of elevation angles relative to the antenna panel of the second wireless device.

In some examples of the method, apparatuses, and non-transitory computer-readable medium described herein, transmitting the signaling indicating the first angular range may include operations, features, means, or instructions for transmitting a first indication that maps to a respective range of azimuth angles relative to an antenna panel of the second wireless device and transmitting a second indication that maps to a respective range of elevation angles relative to the antenna panel of the second wireless device.

In some examples of the method, apparatuses, and non-transitory computer-readable medium described herein, receiving the beam information may include operations, features, means, or instructions for receiving, based on the reference signal and one or more additional reference signals transmitted via one or more additional transmit beams of the set of transmit beams, channel information that may be independent of each transmit beam of the set of transmit beams and each receive beam of a set of receive beams for the first wireless device.

In some examples of the method, apparatuses, and non-transitory computer-readable medium described herein, receiving the beam information may include operations, features, means, or instructions for receiving, based on the reference signal, channel information specific to a beam pair including the transmit beam and a receive beam of a set of receive beams for the first wireless device.

In some examples of the method, apparatuses, and non-transitory computer-readable medium described herein, the second wireless device includes a base station and the reference signal includes a channel state information reference signal, one or more signals of an SSB, or any combination thereof.

In some examples of the method, apparatuses, and non-transitory computer-readable medium described herein, transmitting the signaling indicating the first angular range may include operations, features, means, or instructions for transmitting DCI, a MAC-CE, RRC signaling, or any combination thereof that indicates the first angular range.

In some examples of the method, apparatuses, and non-transitory computer-readable medium described herein, the second wireless device includes a UE and the reference signal includes an SRS.

In some examples of the method, apparatuses, and non-transitory computer-readable medium described herein, transmitting the signaling indicating the first angular range may include operations, features, means, or instructions for transmitting UCI, a MAC-CE, RRC signaling, or any combination thereof that indicates the first angular range.

DETAILED DESCRIPTION

Figure 1:
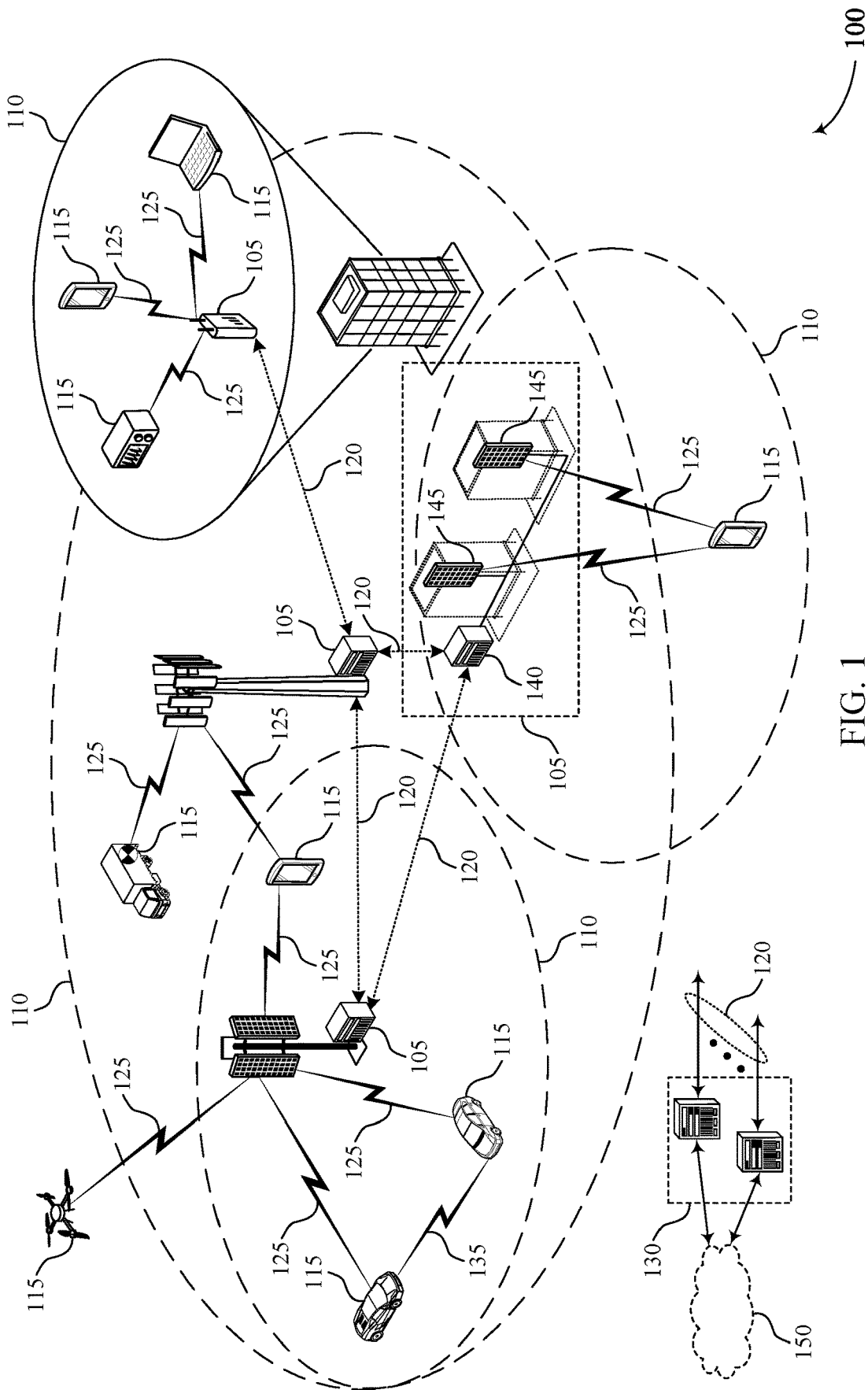
FIGS. 1 and 2 illustrate examples of a wireless communications system that supports relative beam direction indication for beam management in accordance with aspects of the present disclosure.

In some examples, a base station and a user equipment (UE) may perform a beam management procedure to determine the best beam for subsequent communication with one another. During the beam management procedure, the base station may transmit a series of signals (e.g., signals of a synchronization signal blocks (SSBs) or channel state information reference signals (CSI-RSs)) to the UE using a set of transmit beams. The UE may receive the signals using a set of receive beams and select a transmit beam from the set that is associated with a signal that has the highest measured signal strength (e.g., highest reference signal received power (RSRP)) and indicate the transmit beam to the base station (e.g., indicate an SSB index). In some examples, the UE may randomly select receive beams for receiving the series of reference signals from the base station. As such, the UE may waste valuable resources testing obviously bad transmit/receive beam pairs.

A directional beam may be formed using analog beamforming, hybrid beamforming, or digital beamforming. In analog beamforming, a beam is controlled by adjusting analog phase shifters along a radio frequency path. As such, there may be phase shifter for each antenna element and a common analog to digital-to-analog converter (ADC) or digital to analog converter (DAC). In digital beamforming, phases and amplitude are digitally controlled by baseband processing. As such, there may a ADC or DAC per antenna element. In some examples, digital beamforming may result in more power consumption then analog beamforming because of the multiple ADCs or DACs. Therefore, low-resolution ADCs or DACs may be used in digital beamforming to curb power consumption. In some examples, the UE may utilize beamformed channel measurements (e.g., determined during a beam management procedure) to estimate the channel such that channel state feedback (CSF) reporting may be enhanced, among other advantages. However, the UE may be unable to utilize beamformed measurements for channel estimation if low-resolution ADCs or DACs are used.

As described herein, a wireless device (e.g., a UE or a base station) may perform beamformed channel measurements while supporting analog, hybrid, and digital beamforming. In some examples, a first wireless device may transmit signaling to a second wireless device indicating a relative direction of a transmit beam for a reference signal, and the second wireless device may select a receive beam for receiving the reference signal based on the indicated relative direction therefor.

In some cases, the relative direction may be or correspond to an angular range (which may be alternatively referred to as an angle cover range or an angle range), where the angular range may include angles associated with at least two transmit beams of a set of transmit beams. As an illustrative example, the azimuth dimension (e.g., azimuth angles relative to the antenna panel of the transmitting device) may be divided into three angular ranges corresponding to left, center, and right—e.g., if an azimuth angle of zero degrees is perpendicular to the antenna panel, azimuth angles pointing away from the antenna panel in a leftward direction (azimuth angles of negative 90 degrees to negative 30 degrees), azimuth angles pointing away from the antenna panel in a central direction (azimuth angles of negative 30 degrees to positive 30 degrees), and azimuth angles pointing away from the antenna panel in a rightward direction (azimuth angles of positive 30 degrees to positive 90 degrees). Similarly, the elevation dimension (e.g., elevation angles relative to the antenna panel of the transmitting device) may be divided into three angular ranges corresponding to down, middle, and up—e.g., if an elevation angle of zero degrees is perpendicular to the antenna panel, elevation angles pointing away from the antenna panel in a downward direction (elevation angles of negative 90 degrees to negative 30 degrees), elevation angles pointing away from the antenna panel in a middle direction (elevation angles of negative 30 degrees to positive 30 degrees), and elevation angles pointing away from the antenna panel in an upward direction (elevation angles of positive 30 degrees to positive 90 degrees).

Angular ranges for azimuth or elevation dimensions may be defined according to finer or coarser granularity (e.g., two angular ranges for an angular dimension, or four or more angular ranges for an angular dimension) in other examples. An indication of a relative direction may indicate a corresponding angular range in the azimuth dimension, in the elevation dimension, or both based one or more index values or other associated indicators (e.g., a first index value corresponding to an angular range for the azimuth dimension and a second index value corresponding to an angular range for the elevation dimension where a first set of indices are defined for the azimuth dimension and a second set of indices are defined for the elevation dimension, or a single index value where each index of a set of indices corresponds to a particular combination of an azimuth angular range and an elevation angular range).

The set of transmit beams may be beams that the first wireless device may sweep through during a beam management procedure. Based on the indicated relative direction for a reference signal, the second wireless device may select a receive beam from a set of receive beams. The set of receive beams may include beams that the second device may potentially use to receive signals during the beam management procedure. The first wireless device may transmit a reference signal using a transmit beam that corresponds to the indicated relative direction (e.g., is within the associated angular range), and the second wireless device may receive the signal using the selected receive beam. The second wireless device may select the receive beam so as to enhance the signal quality with which the reference signal is received—e.g., if an antenna panel of the receive device is oriented to directly face the antenna panel of the transmitting device, and the relative direction is leftward from the perspective of the antenna panel of the transmitting device, the second wireless device may select a receive beam that is rightward from the perspective of the antenna panel of the receiving device, or if the relative direction is downward from the perspective of the antenna panel of the transmitting device, the second wireless device may select a receive beam that is also downward from the perspective of the antenna panel of the receiving device.

In some examples, the second wireless device may select the receive beam based on a previously performed a previously performed beam management procedure. For example, based on a previously performed beam management procedure, the second wireless device may determine that a receive beam provides particularly good or bad signal quality for receiving signals via a given transmit beam or relative direction as may be indicated by the first wireless device. If the second wireless device has determined that a receive beam is particularly good for receiving signals from the first wireless device corresponding to a first relative direction, the second wireless device may select that receive beam when the first relative direction is later indicated for another reference signal as part of a subsequent beam management procedure. Additionally or alternatively, the second wireless device may select a different receive beam when a second relative direction is later indicated for another reference signal as part of the subsequent beam management procedure (e.g., if a first receive beam is good for receiving signals via a leftward azimuth direction, then the second wireless device may determine that the first receive beam will not be good for receiving signals via a rightward azimuth direction and hence may select a second receive beam).

Additionally or alternatively, the receiving device may determine channel measurements corresponding to the transmit beam and the selected receive beam and use the channel measurements to estimate channel measurements of other possible beam pairs or to estimate the raw channel between the transmitting device and the receiving device. In some examples, the receiving device may utilize the channel measurements to enhance CSF feedback.

Using the methods as described herein, a receiving device may exclude receive beams that unlikely to be suitable for a transmit beam (e.g., during a beam management procedure) which may decrease overhead signaling. In addition, the methods as described herein, may allow for raw channel estimation without testing all possible beam pairs decreasing the overall power consumption at the receiving and transmitting device.

Aspects of the disclosure are initially described in the context of wireless communications systems. Additional aspects of the disclosure are described in the context of a side view of an antenna panel, a top view of an antenna panels, and a process flow. Aspects of the disclosure are further illustrated by and described with reference to apparatus diagrams, system diagrams, and flowcharts that relate to relative beam direction indication for beam management.

FIG. 1 illustrates an example of a wireless communications system 100 that supports relative beam direction indication for beam management in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS, which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

As described herein, a receiving device (e.g., the UE 115 or the base station 105) to determine a directional beam via which to receive a signal from a transmitting device (e.g., the UE 115 or the base station 105) based on a relative direction indication associated with a directional beam used to transmit the signal. In some examples, the transmitting device may transmit a relative direction indication to the receiving device, where the relative direction corresponds to a first angular range (e.g., first span of azimuth angles, elevation angles, or any combination thereof relative to an antenna panel or other feature of the transmitting device), and where the first angular range includes angles associated with two or more transmit beams. The receiving device may select a receive beam from a set of receive beams based on the relative direction indication. The transmitting device may transmit a reference signal to the receiving device using a transmit beam of the two or more transmit beams and the receiving device may receive the reference signal using the selected receive beam.

The methods as described herein may allow a receiving device to decrease the amount of candidate beam pairs that the receiving device considers during a beam management procedure thereby decreasing overhead signaling. In addition, the methods as described herein may allow a receiving device to determine beams pairs of interest. The receiving device may perform beamformed channel measurements for the beam pairs of interest and estimate channel measurements for all other beam pairs, for the raw channel between the receive device and the transmitting device, or both, based on the beamformed channel measurement for the beam pairs of interest. By doing so, the receiving device may not perform channel measurement for all possible beam pairs decreasing power consumption at the receiving device related to performing beamformed channel measurements for all possible beam pairs.

Figure 2:
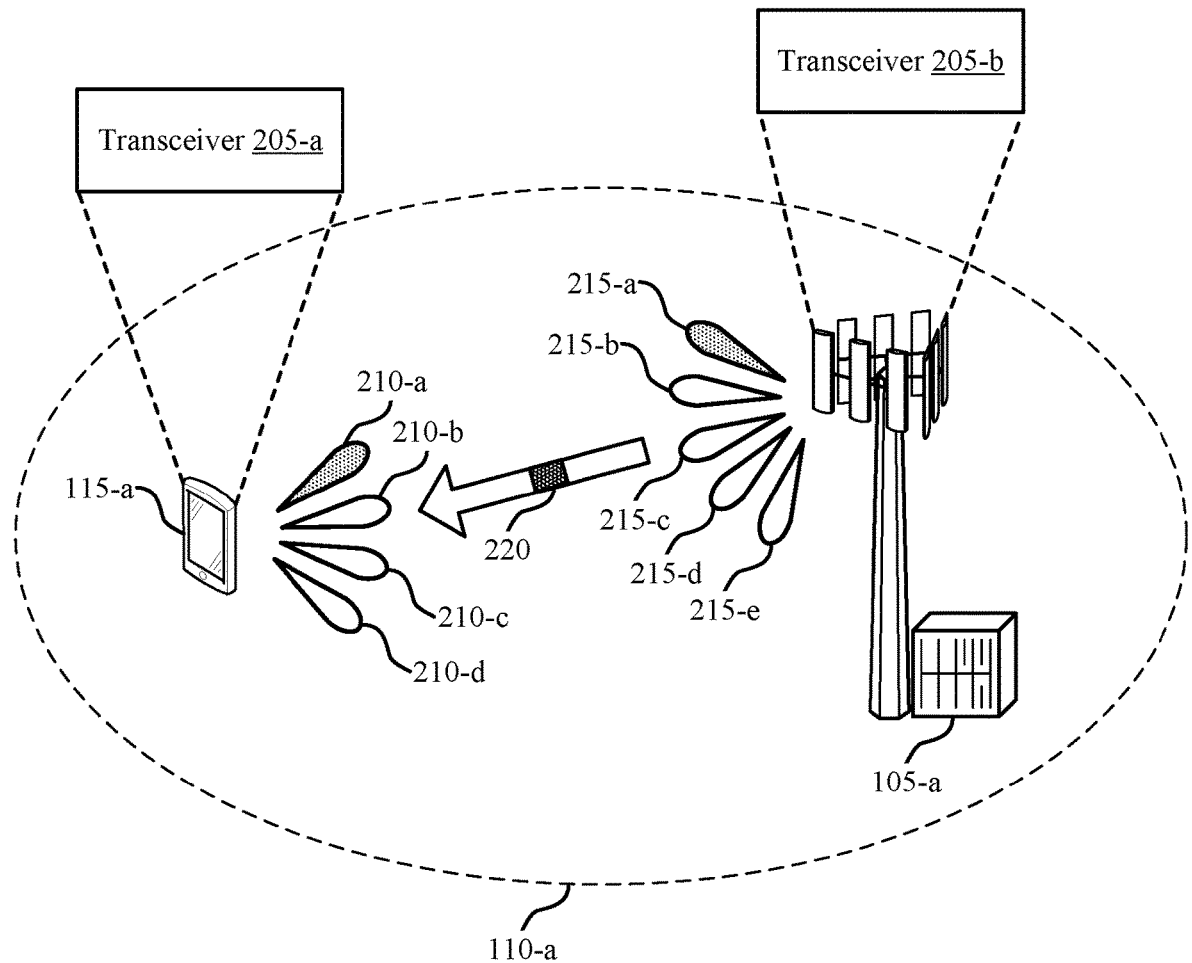
Figure 2:

FIG. 2 illustrates an example of a wireless communications system 200 that supports relative beam direction indication for beam management in accordance with aspects of the present disclosure. In some examples, the wireless communications system 200 may implement aspects of a wireless communications system 100. For example, the wireless communications system 200 may include a UE 115-a and a base station 105-a which may be examples of a UE 115 and a base station 105 as described with reference to FIG. 1. In some examples, the base station 105-a and the UE 115-a may be located in a coverage area 110-a.

In some examples, the base station 105-a and the UE 115-a may communicate with one another using directional beams. In one example, the base station 105-a may be an example of a transmitting device and the UE 115-a may be example of a receiving device. The base station 105-a may transmit signals to the UE 115-a using a directional beam 215 and the UE 115-a may receive the signals from the base station 105-a using a directional beam 210. In another example, the UE 115-a may be an example of the transmitting device and the base station 105-a may be example of the receiving device. The UE 115-a may transmit signals to the base station 105-a using a directional beam 210 and the base station 105-a may receive the signals from the UE 115-a using a directional beam 215.

To form these directional beams, the UE 115-a may implement a transceiver 205-a and the base station may implement a transceiver 205-b. The different types of beamforming may be analog beamforming, digital beamforming, and hybrid beamforming. In analog beamforming, phase shifter are used to send the same signal from multiple antennas at a different phase. As such, to support analog beamforming, the transceiver 205 may include a phase shifter for each antenna element and one analog-to-digital converter (ADC) per radio frequency chain in the case that the transceiver 205 is acting as a receiver or one digital-to-analog converter (DAC) in the case that the transceiver 205 is acting as a transmitter. In digital beamforming, phase or amplitude of the signal are digitally controlled by baseband processing. As such, to support digital beamforming, the transceiver 205 may include an ADC for each radio frequency chain in the case that the transceiver 205 is acting as a receiver and a DAC for each radio frequency chain in the case that the transceiver 205 is acting as a transmitter and no phase shifters. As the name suggest, hybrid beamforming may be combination of both analog beamforming and digital beam forming. Analog and hybrid beamforming may be performed in radio frequency or at an intermediate frequency. Analog and hybrid beamforming may be considered more power efficient than digital beamforming because analog and hybrid beamforming may use only one ADC or DAC per radio frequency chain. However, unlike digital beamforming, analog and hybrid beamforming may only be capable of receiving in one or a few different directions in a given time which may limit multiplexing capability. To make digital beamforming more power efficient, low resolution ADCs or DACs may be implemented.

In some examples, the base station 105-a and the UE 115-a may undergo a beam management procedure in an effort to discover a best beam pair (e.g., best transmit directional beam and corresponding receive directional beam) for communication between the two. The beam management procedure may occur in phases. During the first phase, the base station 105-a may sweep through directional beams 215 and the UE 115-a may report, to the base station 105-a, the best one. As one example, the base station 105-a may transmit a series of reference signals (e.g., series of SSBs) to the UE 115-a using the directional beam 215-a, the directional beam 215-b, the directional beam 215-c, and the directional beam 215-d. The UE 115-a may receive each one of the series of reference signals using one of the directional beam 210-a, the directional beam 210-b, the directional beam 210-c, and the directional beam 210-d and may measure the signal strength of each reference signal. In some examples, the UE 115-a may randomly select which directional beam 210 will receive each reference signal of the series. The UE 115-a may select the directional beam 215 associated with the reference signal that has the highest signal strength and transmit an indication of the directional beam 215 (e.g., SSB index) to the base station 105-a. During the second phase, the base station 105-a may sweep narrower directional beams (not shown in FIG. 2) over a narrower range and the UE 115-a may report the best one to the base station 105-a in a similar manner as in the first phase. The signals utilized in phase 2 may be channel CSI-RSs. During the third phase, the base station 105-a may repeatedly transmit signals to the UE 115-a using the same directional beam and the UE 115-a may refine its directional beam 210.

In some examples, the wireless communications system 200 may perform beamformed channel measurements during the beam management procedure or during a different operation to estimate the underlying raw channel. As used herein, the raw channel may refer to the communications channel between the base station and the UE in the absence of beamforming (e.g., as observed at the antenna ports of the base station or UE in the absence of analog beamforming) and may alternatively be referred to as the full channel, non-beamformed channel, or complete channel. Hence, the raw channel (and related channel state information) may be applicable to any signaling between the base station and the UE, including beamformed signaling using any beam pair link (e.g., whether the beam pair link includes a predefined transmit beam and predefined receive beams based on the codebook, or whether the beam pair link includes one or more customized—e.g., non-codebook-based—beams).

The raw channel may be represented by a channel matrix, where one or more dimensions of the channel matrix may be based on a total quantity of receive antenna ports of the receiving device (e.g., UE 115-a) or antenna panel thereof, or a total quantity of transmit antenna ports of the transmitting device (e.g., base station 105-a) or antenna panel thereof, or both. For example, a first dimension of the channel matrix may be equal to the total quantity of receive antenna ports of the receiving device, and a second dimension of the channel matrix may be equal to the total quantity of transmit antenna ports of the transmitting device—e.g., if the receiving device has 8 receive antenna ports and the transmitting device has 64 transmit antenna ports, the channel matrix may be an 8×64 matrix and thus include 512 elements.

By estimating the raw channel, the UE 115-a may enhance CSF reporting to the base station 105-a. Enhanced CSF feedback may allow the base station 105-a greater flexibility in selecting transmit beams. That is, the base station 105-a may select transmit beams that are not included in the DFT-based codebook beams based on CSF feedback. In order to estimate the channel, the UE 115-a or the base station 105-a may measure all possible transmit/receive beam pairs. In one example, the base station 105-a may be capable of forming 64 different directional transmit beams and the UE 115-a may be capable of forming 8 different directional receive beams. In such example, the total number of possible beamformed measurements or transmit/receive beam pairs may be 512. Measuring all of the transmit/receive beam pairs may increase overhead signaling and, in some examples, the channel measurements may be stale. In addition, it may prove difficult to perform raw channel estimation using low-resolution ADC or DACs in digital beamforming.

As described herein, a receiving device may select a directional beam for receiving a signal from a transmitting device based at least in part on a relative direction indication 220 associated with a directional beam to be used to transmit the signal. In some examples, the transmitting device may determine a directional beam to use for transmission of the signal (e.g., a reference signal) and determine an angle associated with the directional beam. The angle may fall within one of a set of angle ranges. In some examples, the set of angle ranges may be pre-configured at the transmitting device or the receiving device. Each angle range of the set of angle ranges may include angles associated with at least two different directional beams and the angle ranges may not overlap one another. The transmitting device may transmit the relative direction indication 220 including the angle range of the determined directional beam and the receiving device may utilize the relative direction indication 220 to select a directional beam to receive the signal from the transmitting device. In some examples, the receiving device may utilize the relative direction indication 220 along with knowledge obtained during a previous beam management procedure to select the directional beam to receive the signal. In some examples, the receiving device may input the angle range indicated in the relative direction indication 220 into a machine learning algorithm to determine the directional beam to receive the signal. In another example, the UE may utilize information related to its location or orientation along with the relative direction indication 220 to determine the directional beam to receive the signal.

As one example, the base station 105-a may be the transmitting device and the UE 115-a may be the receiving device. The base station 105-a may be configured with a set of directional beams 215 and each directional beam 215 of the set may be associated with a different angle or direction. In some examples, the base station 105-a may identify an angle range which includes all of the angles associated with the set of directional beams 215 and divide the angle range into multiple smaller angle ranges. For example, the base station 105-a may divide the angle range into at least a first angle range, a second angle range, and a third angle range. The first angle range may include the directional beam 215-a and the directional beam 215-b, the second angle range may include the directional beam 215-c and the directional beam 215-d, and the third angle range may include a directional beam 215-e.

In some examples, the base station 105-a may determine to transmit a signal (e.g., an SSB or a CSI-RS) using the directional beam 215-a to the UE 115-a and may transmit the relative direction indication 220 to the UE 115-a including the first angle range. Based on the relative direction indication, the UE 115-a may determine to receive the signal using the directional beam 210-a. In some examples, the UE 115-a may use knowledge of a previous beam management procedure along with the relative direction indication 220 to select the directional beam 210. For example, the UE 115-a may determine that directional beam 210-d is the best beam for receiving a signal transmitted via directional beam 215 as a result of a prior beam management procedure. Because the directional beam 210-d is opposite from the directional beam 210-a, the UE 115-a may intelligently infer that the directional beam 210-a will be the best beam for receiving the signal via the directional beam 215-a. In addition, the UE 115-a may use this information to exclude directional beams (e.g., during a beam management procedure). For example, because the directional beam 210-d was the best receive beam for receiving the signals via the directional beam 215-e, the UE 115-a may intelligently infer that directional beam 210-d will not be the best directional beam for receiving the signals over the directional beam 215-a and may exclude the directional beam 210-d. As such, the UE 115-a may not test a beam pair corresponding to the directional beam 215-a and the directional beam 215-d during a beam management procedure. Similar methods as described above may be applied in the case that UE 115-a is the transmitting device and the base station 105-a is the receiving device with the main difference being that the signal transmitted from the UE 115-a to the base station 105-a being a sounding reference signal (SRS).

The receiving device may additionally determine channel measurements of the signals received from the transmitting device using the above methods. Once the receiving device determines channel measurements for at least two beam pairs (e.g., for the beam pair corresponding to the directional beam 215-a and the directional beam 210-a and another beam pair), the receiving device may estimate the underlying raw channel. In order the estimate that raw underlying channel, the receiving device may utilize a sparse recovery algorithm (e.g., orthogonal matching pursuit or any other compressed sensing technique) or the receiving device may implement machine learning to reconstruct the underlying raw channel. The methods as described herein may allow a receiving wireless device (e.g., a base station 105-a and the UE 115-a) to receive signals from a transmitting device over a curated set of receive beams which may reduce overhead signaling during a beam management procedure. In addition, the methods as described herein may allow a receiving device to estimate the raw channel without measuring the channel for every receive/transmit beam combination, thereby decreasing power consumption at the receiving device.

Figure 3A:
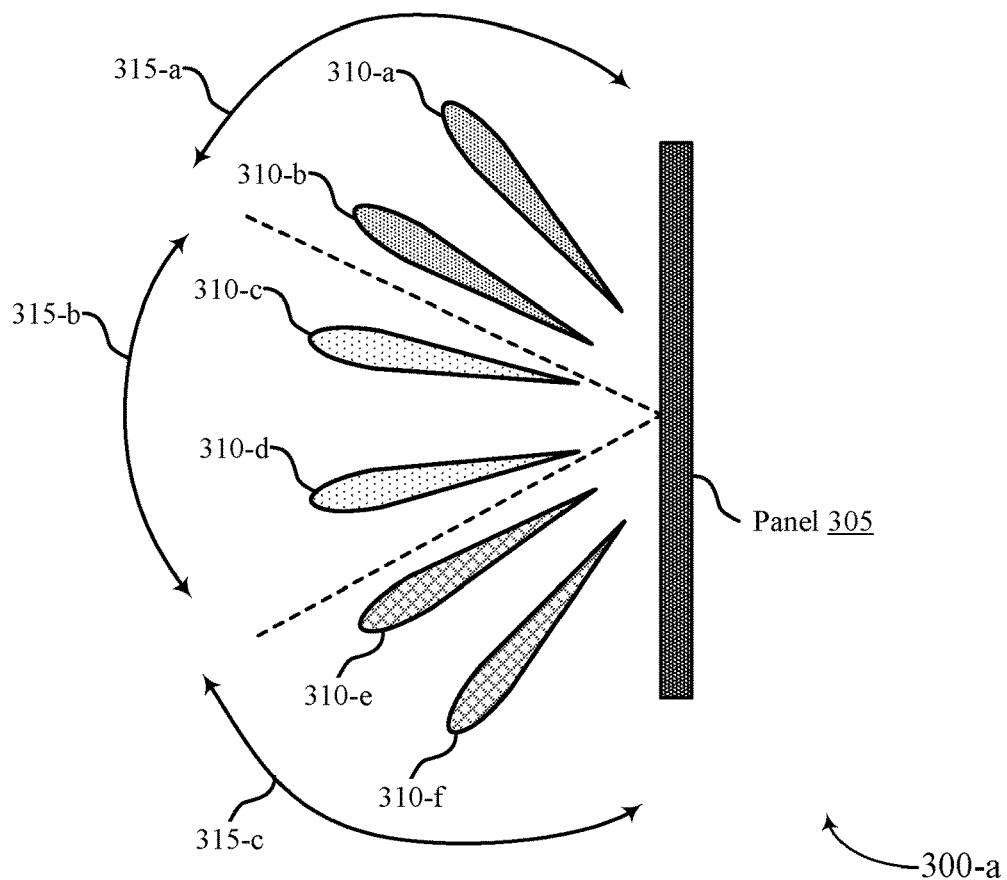
FIG. 3A illustrates an example of a side view of an antenna panel that supports relative beam direction indication for beam management in accordance with aspects of the present disclosure.
Figure 3B:
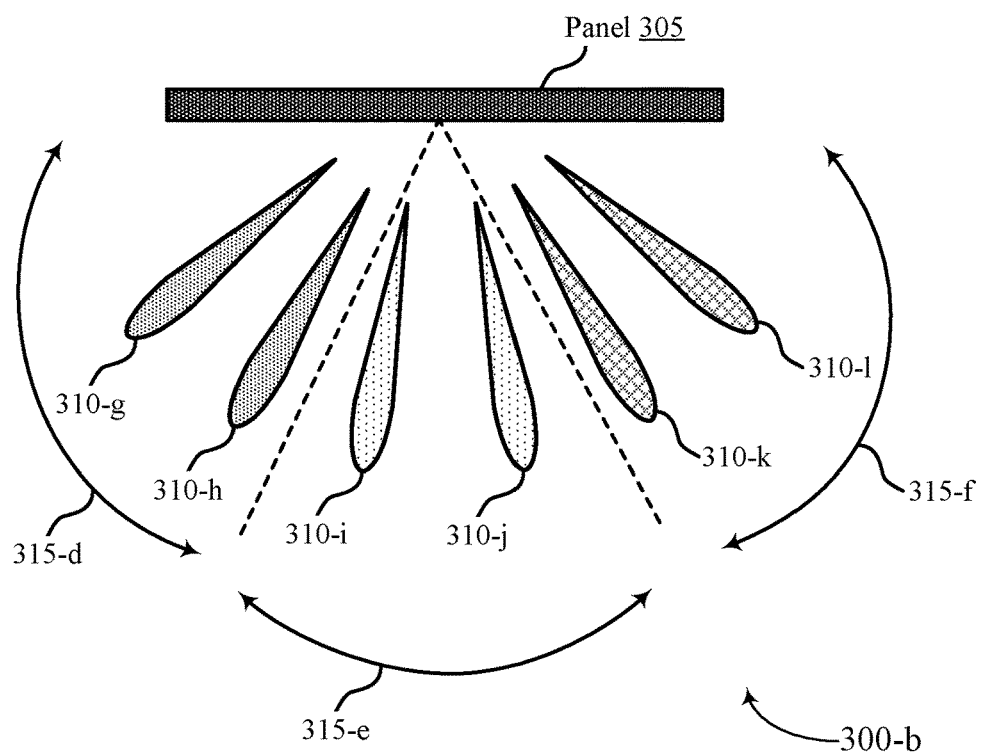
FIG. 3B illustrates an example of a top view of an antenna panel that supports relative beam direction indication for beam management in accordance with aspects of the present disclosure.

FIGS. 3A and 3B illustrate an example of a side view of an antenna panel 300-a and an example of a top view of an antenna panel 300-b, respectively, that supports relative beam direction indication for beam management in accordance with aspects of the present disclosure. In some examples, the side view of an antenna panel 300-a and the top view of an antenna panel 300-a may implement aspects of a wireless communications system 100 and a wireless communications system 200. For example, a UE 115 or a base station 105 as described with reference to FIGS. 1 and 2 may implement a panel 305 to form directional beams.

In some examples, a transmitting device may include the panel 305. The panel 305 may allow the transmitting device to transmit signals to a receiving device using a set of directional beams 310. Each directional beam 310 of the set may correspond to a different elevation angle as shown in FIG. 3A, a different azimuth angle as shown in FIG. 3B, or both. In some examples, the set of directional beams 310 may span a large number of degrees (e.g., 180 degrees in azimuth or 180 degrees in elevation) and the transmitting device may divide the large number of degrees into two or more angle ranges. For example, as shown in FIG. 3A, the transmitting device may divide the number of degrees spanned by the set of directional beams 310 into an angle range 315-a, an angle range 315-b, and an angle range 315-c. In FIG. 3B, the transmitting device may divide the number of degree spanned by the set of directional beams 310 into an angle range 315-d, an angle range 315-e, and an angle range 315-f. Each angle range 315 may correspond to two or more directional beams 310 of the set. For example, the angle range 315-a may include angles corresponding to the directional beam 310-a and the directional beam 310-b. The angle range 315-b may include angles corresponding to the directional beam 310-c and the directional beam 310-d. The angle range 315-c may include angles associated with the directional beam 310-e and the directional beam 310-f. The angle range 315-d may include angles corresponding to the directional beam 310-g and the directional beam 310-h. The angle range 315-e may include angles corresponding to the directional beam 310-i and the directional beam 310-j. The angle range 315-f may include angles associated with the directional beam 310-k and the directional beam 310-l. Though the examples of FIGS. 3A and 3B show the azimuth dimension as being divided into three angle ranges 315 and the elevation dimension as also being divided into three angle ranges 315, it is to be understood that the azimuth and elevation dimensions may be divided into any quantity of angle ranges 315, and also not necessarily the same quantity for both dimensions.

As described with reference to FIG. 2, a transmitting device (e.g., a UE or a base station) may transmit a relative direction indication to a receiving device (e.g., a UE or a base station) indicating a relative direction of a beam that will be used to transmit a signal to the receiving device. In some examples, the relative beam direction may include an indication of an angle range 315, where the angle range 315 includes an angle associated with the beam to be used to transmit the signal. For example, the transmitting device may select a directional beam 310-c to use to transmit a signal (e.g., an SSB or a CSI-RS for downlink or an SRS for uplink) to a receiving device (e.g., as part of a beam management procedure (e.g., the first phase or the second phase) or as part of an operation separate from the beam management procedure). Prior to transmitting the signal using the directional beam 310-c, the transmitting device may transmit a relative direction indication that includes an indication of the angle range 315-b. Based on the relative direction indication and other information (e.g., orientation of the receiving device, beam information from a previous beam management procedure, etc.), the receiving device may select a receive beam to receive the signal from the signal from the transmitting device. The transmitting device may transmit the signal to the receiving device via directional beam 310-c and the receiving device may receive the signal using the selected receive beam.

In some examples, a directional beam 310 of the set of directional beams 310 may be included in an azimuth angle range and an elevation angle range. For example, the directional beam 310-c may be the same directional beam as directional beam 310-i. In such case, the transmitting device may transmit a relative direction indication including an indication of the angle range 315-b and the angle range 315-i. For example, each index of a set of indices may corresponds to a particular combination a respective azimuth angular range and a respective elevation angular range, and thus a single index value may indicate both an azimuth angular range and an elevation angular range. Alternatively, the transmitting device may transmit a relative direction indication including an indication of the angle range 315-b and a second relative beam indication including an indication of the angle range 315-i. For example, a first set of indices may be defined for the azimuth dimension and a second set of indices may be defined for the elevation dimension, and thus a first index value may indicate an azimuth angular range, and a second index value may indicate an elevation angular range.

Figure 4:
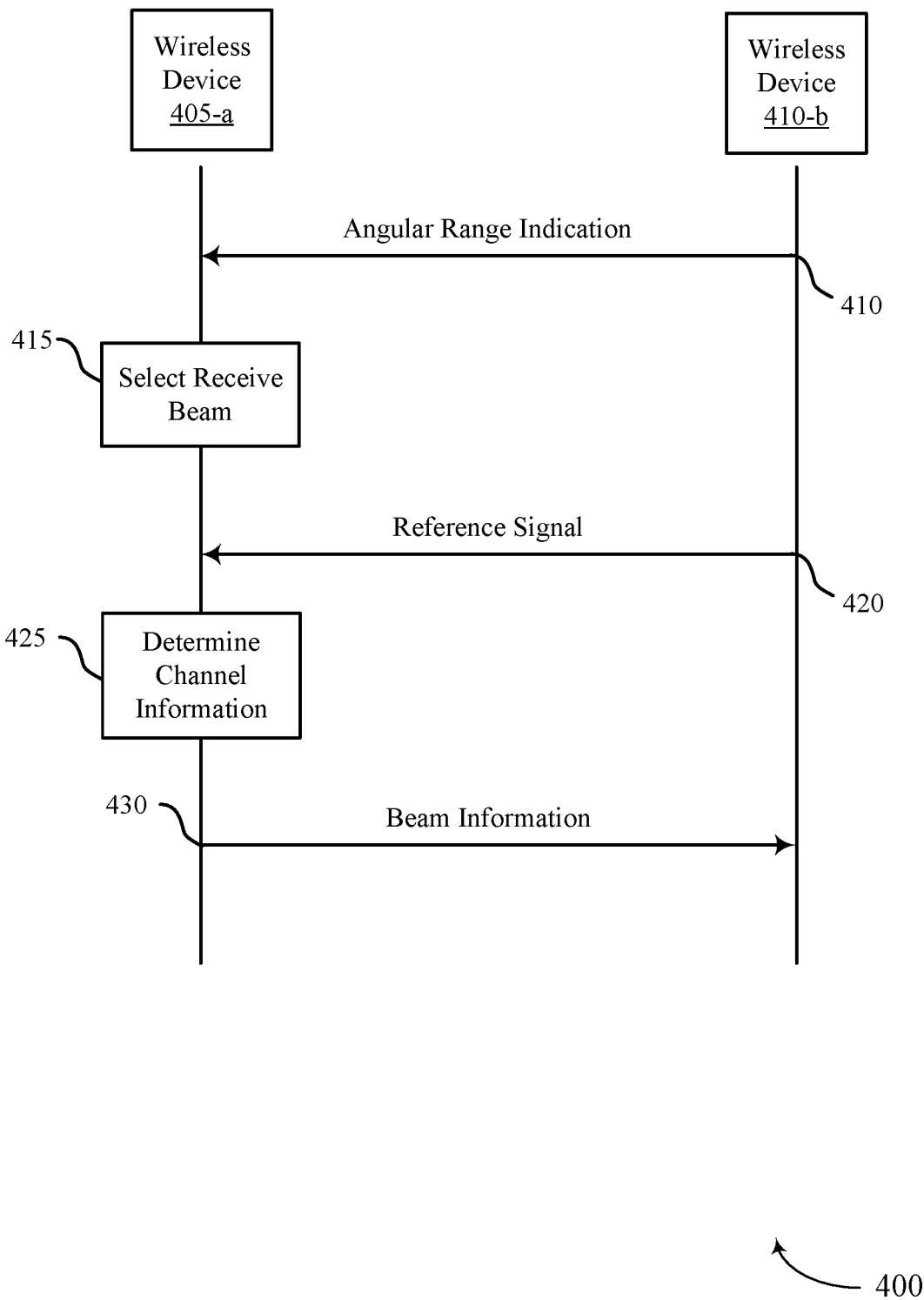
FIG. 4 illustrates an example of a process flow that supports relative beam direction indication for beam management in accordance with aspects of the present disclosure.

FIG. 4 illustrates an example of a process flow 400 that supports relative beam direction indication for beam management in accordance with aspects of the present disclosure. In some examples, the process flow 400 may implement or be implemented by aspects of a wireless communications system 100 and a wireless communications system 200. For example, the process flow 400 may be implemented by a wireless device 405-a and a wireless device 405-b which may be examples of a base station 105 and a UE 115 as described with reference to FIGS. 1 and 2. Alternative examples of the following may be implemented, where some steps are performed in a different order then described or are not performed at all. In some cases, steps may include additional features not mentioned below, or further steps may be added.

At 410, the wireless device 405-b may transmit signaling indicating a first angular range. The first angular may be included in a set of angular ranges, where the set of angular range are associated with a set of transmit beams configured for the wireless device 405-b. The first angular range may correspond to at least two transmit beams of the set of transmits beams and the set of angle ranges may span a set of azimuth angles, a set of elevation angles, or both relative to an antenna panel of the wireless device 405-b.

In some examples, the wireless device 405-a may be an example of a UE and a base station may be an example of a wireless device 405-b. In such case, the indication of the first angle range may be signaled to the UE via a medium access control-control element (MAC-CE), radio resource control (RRC) or dynamically via downlink control information (DCI). In another example, the wireless device 405-b may be an example of a UE and the wireless device 405-a may be an example of a base station. In such example, the first angle range may be signaled to the base station via uplink control information (UCI), a MAC-CE, or RRC.

At 415, the wireless device 405-a may select a receive beam based on the first angular range. In some examples, the wireless device 405-a may select the receive beam based on the first angular range along with information obtained from a previous beam management procedure. For example, prior to receiving the signaling at 410, the wireless device 405-a may perform a beam management procedure with the wireless device 405-b and determine a best beam pair (e.g., best transmit/receive beam pair) for communicating with one another. The wireless device 405-a may use a relationship between the transmit beam of the best beam pair and the transmit beam used at 410 to determine the receive beam. Alternatively or additionally, the wireless device 405-a may use a relationship between an angular range corresponding to the transmit beam of the best beam pair and the first angular range to determine the receive beam.

In another example, the wireless device 405-a may determine the receive beam based on the first angular range along with location or orientation information associated with the wireless device 405-a. Prior to receiving the signaling, the wireless device 405-b may determine a first orientation or a first location of the wireless device 405-a. The wireless device 405-a may use a relationship between the first location or first orientation of the wireless device 405-a and the current location or orientation of the wireless device 405-a to determine the receive beam.

At 420, the wireless device 405-b may transmit at least one reference signal using the transmit beam of the set of transmit beams and the wireless device 405-a may receive the reference signal using the selected receive beam. In some examples, the wireless device 405-a may be an example of a UE and the wireless device 405-b may be an example of a base station. In such case, the reference signal may be an SSB or a CSI-RS. In another example, the wireless device 405-*b* may be an example of a UE and the wireless device 405-*a* may be an example of a base station. In such example, the reference signal may be an SRS.

At 425, the wireless device 405-*a* may determine channel information for a beam pair comprising the selected receive beam and the transmit beam based on the reference signal received at 420. In some examples, the wireless device 405-*a* may estimate channel information for all beam pairs that comprise respective transmit beams of the set of transmit beams and a respective receive beam of the set of receive beams based on the channel information for the beam pair.

At 430, the wireless device 405-*a* may transmit beam information to the wireless device 405-*b*. In some examples, the beam information may include the channel information for the beam pair, the channel information for all the beam pairs, or both.

Figure 5:
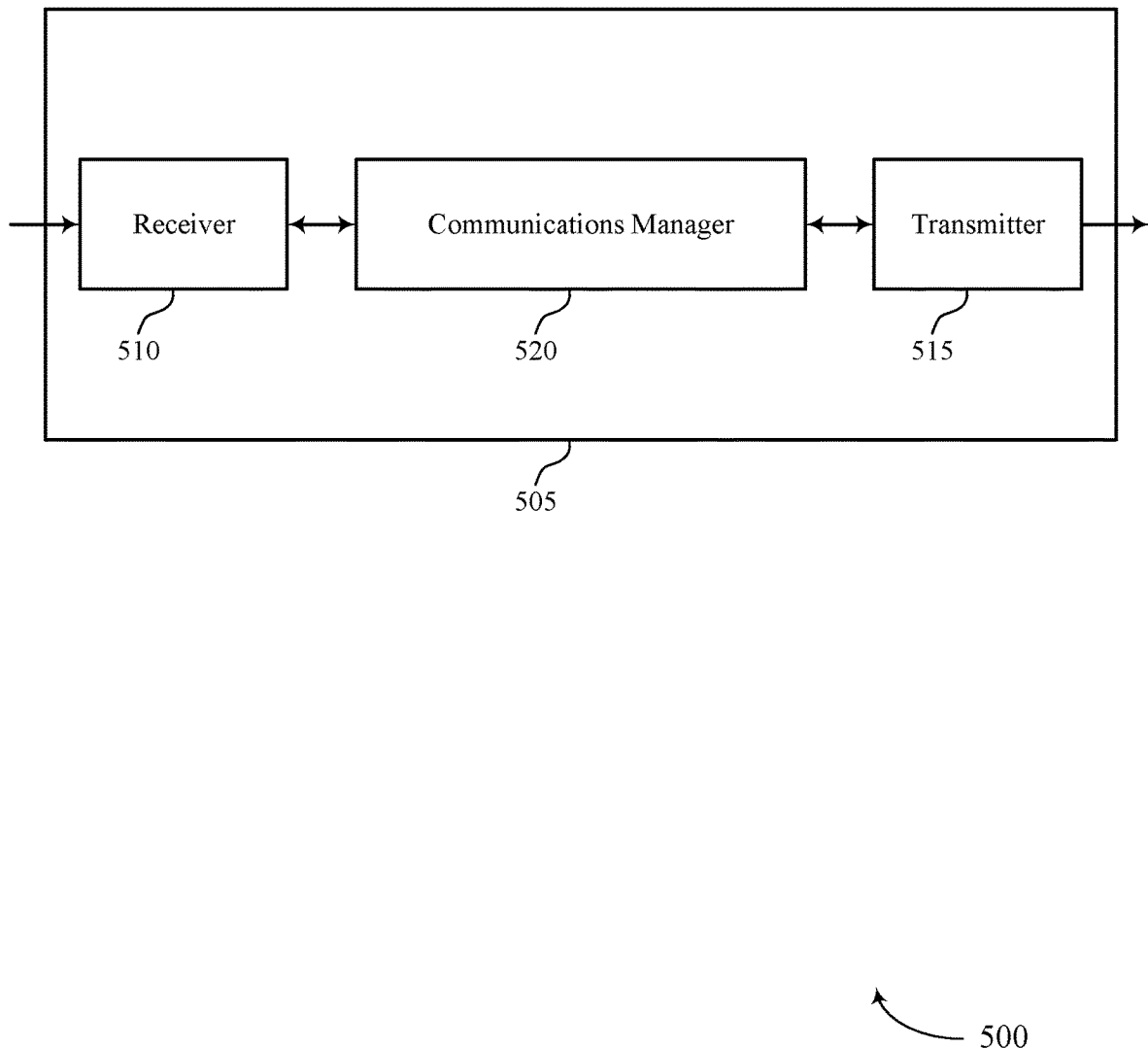
FIGS. 5 and 6 show block diagrams of devices that support relative beam direction indication for beam management in accordance with aspects of the present disclosure.

FIG. 5 shows a block diagram 500 of a device 505 that supports relative beam direction indication for beam management in accordance with aspects of the present disclosure. The device 505 may be an example of aspects of a UE 115 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to relative beam direction indication for beam management). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to relative beam direction indication for beam management). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of relative beam direction indication for beam management as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first wireless device in accordance with examples as disclosed herein. For example, the communications manager 520 may be configured as or otherwise support a means for receiving, from a second wireless device, signaling indicating a first angular range of a set of angular ranges, where the set of angular ranges is associated with a set of transmit beams for the second wireless device, and where the first angular range corresponds to at least two transmit beams of the set of transmit beams. The communications manager 520 may be configured as or otherwise support a means for selecting, from among a set of receive beams for the first wireless device, a receive beam based on the first angular range. The communications manager 520 may be configured as or otherwise support a means for receiving, from the second wireless device, a reference signal using the selected receive beam as part of a beam management procedure. The communications manager 520 may be configured as or otherwise support a means for transmitting, to the second wireless device, beam information based on the reference signal.

Additionally or alternatively, the communications manager 520 may support wireless communication at a second wireless device in accordance with examples as disclosed herein. For example, the communications manager 520 may be configured as or otherwise support a means for transmitting, to a first wireless device, signaling a first angular range of a set of angular ranges, where the set of angular ranges is associated with a set of transmit beams for the second wireless device, and where the first angular range corresponds to at least two transmit beams of the set of transmit beams. The communications manager 520 may be configured as or otherwise support a means for transmitting, to the first wireless device, a reference signal using a transmit beam of the at least two transmit beams as part of a beam management procedure. The communications manager 520 may be configured as or otherwise support a means for receiving, from the second wireless device, beam information based on the reference signal.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption and more efficient utilization of communication resources. Using the methods as described herein, a device 505 may exclude receive beams that unlikely to be suitable for a certain transmit beam (e.g., during a beam management procedure) which may decrease overhead signaling and allow for a more efficient use of resources. In addition, the methods as described herein, may allow for raw channel estimation without testing all possible beam pairs decreasing the overall power consumption at the device 505.

Figure 6:
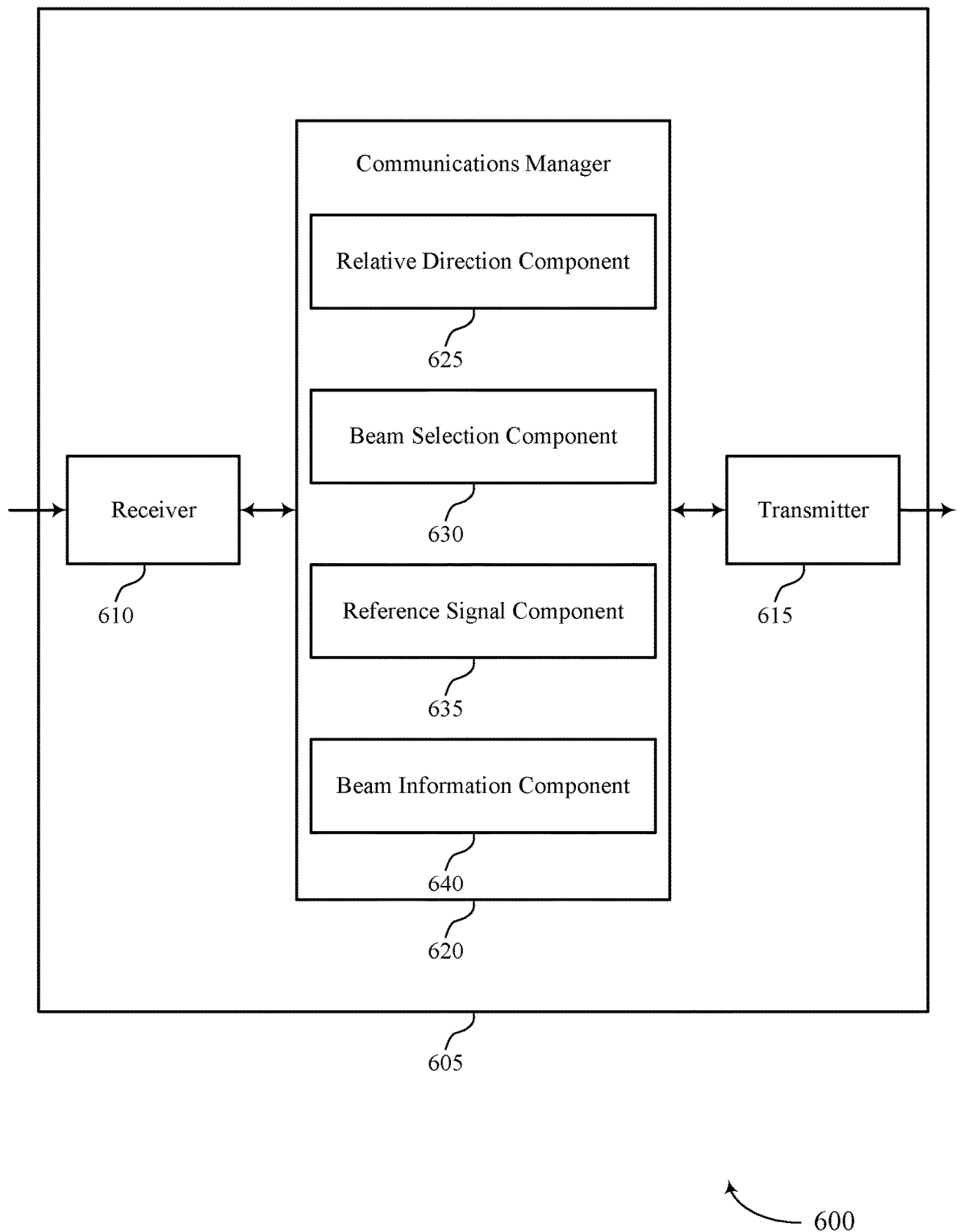

FIG. 6 shows a block diagram 600 of a device 605 that supports relative beam direction indication for beam management in accordance with aspects of the present disclosure. The device 605 may be an example of aspects of a device 505, a UE 115, or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to relative beam direction indication for beam management). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to relative beam direction indication for beam management). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of relative beam direction indication for beam management as described herein. For example, the communications manager 620 may include a relative direction component 625, a beam selection component 630, a reference signal component 635, a beam information component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless device in accordance with examples as disclosed herein. The relative direction component 625 may be configured as or otherwise support a means for receiving, from a second wireless device, signaling indicating a first angular range of a set of angular ranges, where the set of angular ranges is associated with a set of transmit beams for the second wireless device, and where the first angular range corresponds to at least two transmit beams of the set of transmit beams. The beam selection component 630 may be configured as or otherwise support a means for selecting, from among a set of receive beams for the first wireless device, a receive beam based on the first angular range. The reference signal component 635 may be configured as or otherwise support a means for receiving, from the second wireless device, a reference signal using the selected receive beam as part of a beam management procedure. The beam information component 640 may be configured as or otherwise support a means for transmitting, to the second wireless device, beam information based on the reference signal.

Additionally or alternatively, the communications manager 620 may support wireless communication at a second wireless device in accordance with examples as disclosed herein. The relative direction component 625 may be configured as or otherwise support a means for transmitting, to a first wireless device, signaling a first angular range of a set of angular ranges, where the set of angular ranges is associated with a set of transmit beams for the second wireless device, and where the first angular range corresponds to at least two transmit beams of the set of transmit beams. The reference signal component 635 may be configured as or otherwise support a means for transmitting, to the first wireless device, a reference signal using a transmit beam of the at least two transmit beams as part of a beam management procedure. The beam information component 640 may be configured as or otherwise support a means for receiving, from the second wireless device, beam information based on the reference signal.

Figure 7:
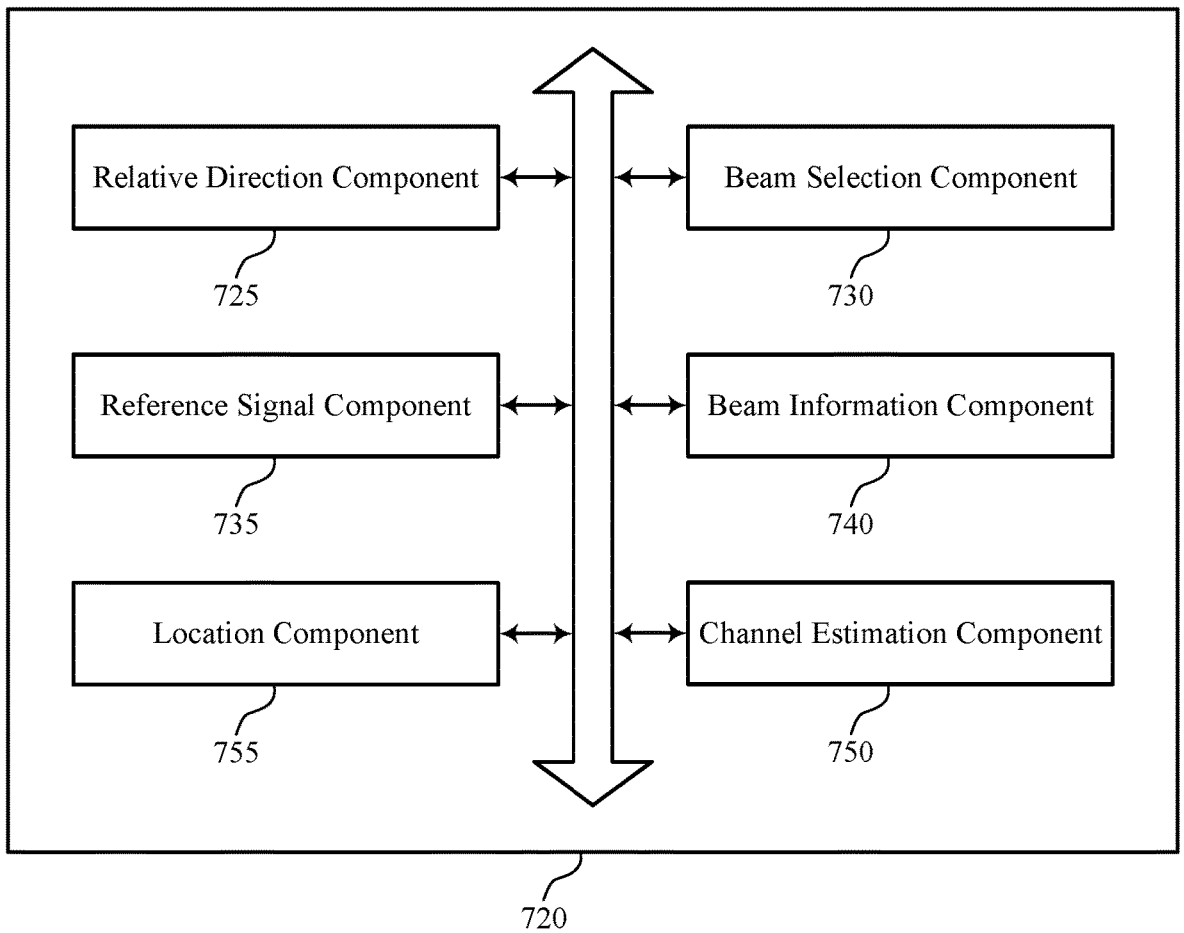
FIG. 7 shows a block diagram of a communications manager that supports relative beam direction indication for beam management in accordance with aspects of the present disclosure.

FIG. 7 shows a block diagram 700 of a communications manager 720 that supports relative beam direction indication for beam management in accordance with aspects of the present disclosure. The communications manager 720 may be an example of aspects of a communications manager 520, a communications manager 620, or both, as described herein. The communications manager 720, or various components thereof, may be an example of means for performing various aspects of relative beam direction indication for beam management as described herein. For example, the communications manager 720 may include a relative direction component 725, a beam selection component 730, a reference signal component 735, a beam information component 740, a channel estimation component 750, a location component 755, or any combination thereof. Each of these components may communicate, directly or indirectly, with one another (e.g., via one or more buses).

The communications manager 720 may support wireless communication at a first wireless device in accordance with examples as disclosed herein. The relative direction component 725 may be configured as or otherwise support a means for receiving, from a second wireless device, signaling indicating a first angular range of a set of angular ranges, where the set of angular ranges is associated with a set of transmit beams for the second wireless device, and where the first angular range corresponds to at least two transmit beams of the set of transmit beams. The beam selection component 730 may be configured as or otherwise support a means for selecting, from among a set of receive beams for the first wireless device, a receive beam based on the first angular range. The reference signal component 735 may be configured as or otherwise support a means for receiving, from the second wireless device, a reference signal using the selected receive beam as part of a beam management procedure. The beam information component 740 may be configured as or otherwise support a means for transmitting, to the second wireless device, beam information based on the reference signal.

In some examples, the set of angular ranges spans a range of azimuth angles relative to an antenna panel of the second wireless device, a respective range of elevation angles relative to the antenna panel of the second wireless device, or both. In some examples, each angular range of the set of angular ranges spans a respective portion of the range of azimuth angles, a respective portion of the range of elevation angles, or both.

In some examples, to support receiving the signaling indicating the first angular range, the relative direction component 725 may be configured as or otherwise support a means for receiving a single indication that maps to a respective range of azimuth angles relative to an antenna panel of the second wireless device and to a respective range of elevation angles relative to the antenna panel of the second wireless device.

In some examples, to support receiving the signaling indicating the first angular range, the relative direction component 725 may be configured as or otherwise support a means for receiving a first indication that maps to a respective range of azimuth angles relative to an antenna panel of the second wireless device. In some examples, to support receiving the signaling indicating the first angular range, the relative direction component 725 may be configured as or otherwise support a means for receiving a second indication that maps to a respective range of elevation angles relative to the antenna panel of the second wireless device.

In some examples, the reference signal component 735 may be configured as or otherwise support a means for receiving, from the second wireless device and prior to the receiving the signaling indicating the first angular range, a set of reference signals using the set of receive beams. In some examples, the beam selection component 730 may be configured as or otherwise support a means for determining, based on the set of reference signals, that a second receive beam of the set of receive beams is associated with a signal strength above a threshold for a second angular range of the set of angular ranges, where selecting the receive beam is based on a first relationship between the selected receive beam and the second receive beam and a second relationship between the first angular range and the second angular range.

In some examples, the channel estimation component 750 may be configured as or otherwise support a means for determining channel information that is independent of each transmit beam of the set of transmit beams and each receive beam of the set of receive beams based on the reference signal and one or more additional reference signals received via one or more additional receive beams of the set of receive beams, where transmitting the beam information includes transmitting the channel information that is independent of each transmit beam of the set of transmit beams and each receive beam of the set of receive beams.

In some examples, the channel estimation component 750 may be configured as or otherwise support a means for determining channel information specific to a beam pair including the selected receive beam and a transmit beam of the set of transmit beams based on the reference signal, where transmitting the beam information includes transmitting the channel information specific to the beam pair.

In some examples, the reference signal component 735 may be configured as or otherwise support a means for receiving, from the second wireless device and prior to the receiving the signaling indicating the first angular range, a set of reference signals using at least a subset of the set of receive beams. In some examples, the location component 755 may be configured as or otherwise support a means for determining, for a first location of the first wireless device associated with receiving the set of reference signals, an orientation of the first wireless device relative to the second wireless device, where selecting the receive beam is based on a relationship between the first location and a second location of the first wireless device associated with receiving the reference signal.

In some examples, the second wireless device may be a base station. In some examples, the reference signal may be a CSI-RS, one or more signals of a SSB, or any combination thereof.

In some examples, to support receiving the signaling indicating the first angular range, the relative direction component 725 may be configured as or otherwise support a means for receiving DCI, a MAC-CE, RRC signaling, or any combination thereof that indicates the first angular range.

In some examples, the second wireless device includes a UE. In some examples, the reference signal includes an SRS.

In some examples, to support receiving the signaling indicating the first angular range, the relative direction component 725 may be configured as or otherwise support a means for receiving UCI, a MAC-CE, RRC signaling, or any combination thereof that indicates the first angular range.

Additionally or alternatively, the communications manager 720 may support wireless communication at a second wireless device in accordance with examples as disclosed herein. In some examples, the relative direction component 725 may be configured as or otherwise support a means for transmitting, to a first wireless device, signaling a first angular range of a set of angular ranges, where the set of angular ranges is associated with a set of transmit beams for the second wireless device, and where the first angular range corresponds to at least two transmit beams of the set of transmit beams. In some examples, the reference signal component 735 may be configured as or otherwise support a means for transmitting, to the first wireless device, a reference signal using a transmit beam of the at least two transmit beams as part of a beam management procedure. In some examples, the beam information component 740 may be configured as or otherwise support a means for receiving, from the second wireless device, beam information based on the reference signal.

In some examples, the set of angular ranges spans a range of azimuth angles relative to an antenna panel of the second wireless device, a respective range of elevation angles relative to the antenna panel of the second wireless device, or both. In some examples, each angular range of the set of angular ranges spans a respective portion of the range of azimuth angles, a respective portion of the range of elevation angles, or both.

In some examples, to support transmitting the signaling indicating the first angular range, the relative direction component 725 may be configured as or otherwise support a means for transmitting a single indication that maps to a respective range of azimuth angles relative to an antenna panel of the second wireless device and to a respective range of elevation angles relative to the antenna panel of the second wireless device.

In some examples, to support transmitting the signaling indicating the first angular range, the relative direction component 725 may be configured as or otherwise support a means for transmitting a first indication that maps to a respective range of azimuth angles relative to an antenna panel of the second wireless device. In some examples, to support transmitting the signaling indicating the first angular range, the relative direction component 725 may be configured as or otherwise support a means for transmitting a second indication that maps to a respective range of elevation angles relative to the antenna panel of the second wireless device.

In some examples, to support receiving the beam information, the beam selection component 730 may be configured as or otherwise support a means for receiving, based on the reference signal and one or more additional reference signals transmitted via one or more additional transmit beams of the set of transmit beams, channel information that is independent of each transmit beam of the set of transmit beams and each receive beam of a set of receive beams for the first wireless device.

In some examples, to support receiving the beam information, the beam information component 740 may be configured as or otherwise support a means for receiving, based on the reference signal, channel information specific to a beam pair including the transmit beam and a receive beam of a set of receive beams for the first wireless device.

In some examples, the second wireless device include a base station. In some examples, the reference signal includes a CSI-RS, one or more signals of an SSB, or any combination thereof.

In some examples, to support transmitting the signaling indicating the first angular range, the relative direction component 725 may be configured as or otherwise support a means for transmitting DCI, a MAC-CE, RRC signaling, or any combination thereof that indicates the first angular range.

In some examples, the second wireless device includes a UE. In some examples, the reference signal includes an SRS.

In some examples, to support transmitting the signaling indicating the first angular range, the relative direction component 725 may be configured as or otherwise support a means for transmitting UCI, a MAC-CE, RRC signaling, or any combination thereof that indicates the first angular range.

Figure 8:
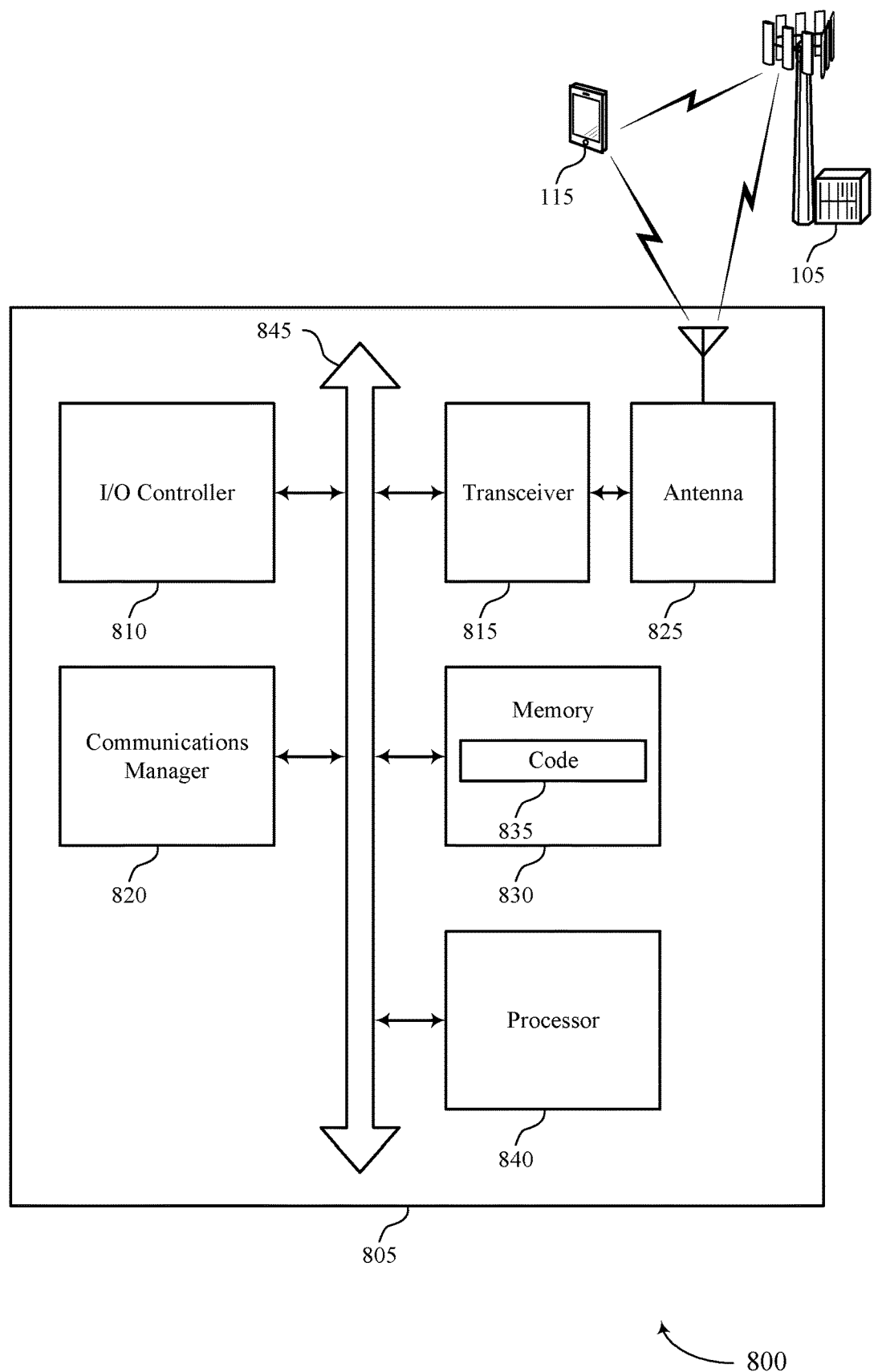
FIG. 8 shows a diagram of a system including a UE that supports relative beam direction indication for beam management in accordance with aspects of the present disclosure.

FIG. 8 shows a diagram of a system 800 including a device 805 that supports relative beam direction indication for beam management in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting relative beam direction indication for beam management). For example, the device 805 or a component of the device 805 may include a processor 840 and memory 830 coupled to the processor 840, the processor 840 and memory 830 configured to perform various functions described herein.

The communications manager 820 may support wireless communication at a first wireless device in accordance with examples as disclosed herein. For example, the communications manager 820 may be configured as or otherwise support a means for receiving, from a second wireless device, signaling indicating a first angular range of a set of angular ranges, where the set of angular ranges is associated with a set of transmit beams for the second wireless device, and where the first angular range corresponds to at least two transmit beams of the set of transmit beams. The communications manager 820 may be configured as or otherwise support a means for selecting, from among a set of receive beams for the first wireless device, a receive beam based on the first angular range. The communications manager 820 may be configured as or otherwise support a means for receiving, from the second wireless device, a reference signal using the selected receive beam as part of a beam management procedure. The communications manager 820 may be configured as or otherwise support a means for transmitting, to the second wireless device, beam information based on the reference signal.

Additionally or alternatively, the communications manager 820 may support wireless communication at a second wireless device in accordance with examples as disclosed herein. For example, the communications manager 820 may be configured as or otherwise support a means for transmitting, to a first wireless device, signaling a first angular range of a set of angular ranges, where the set of angular ranges is associated with a set of transmit beams for the second wireless device, and where the first angular range corresponds to at least two transmit beams of the set of transmit beams. The communications manager 820 may be configured as or otherwise support a means for transmitting, to the first wireless device, a reference signal using a transmit beam of the at least two transmit beams as part of a beam management procedure. The communications manager 820 may be configured as or otherwise support a means for receiving, from the second wireless device, beam information based on the reference signal.

By including or configuring the communications manager 820 in accordance with examples as described herein, the device 805 may support techniques for reduced power consumption and longer battery life.

In some examples, the communications manager 820 may be configured to perform various operations (e.g., receiving, monitoring, transmitting) using or otherwise in cooperation with the transceiver 815, the one or more antennas 825, or any combination thereof. For example, the communications manager 820 may be configured to receive or transmit messages or other signaling as described herein via the transceiver 815. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of relative beam direction indication for beam management as described herein, or the processor 840 and the memory 830 may be otherwise configured to perform or support such operations.

Figure 9:
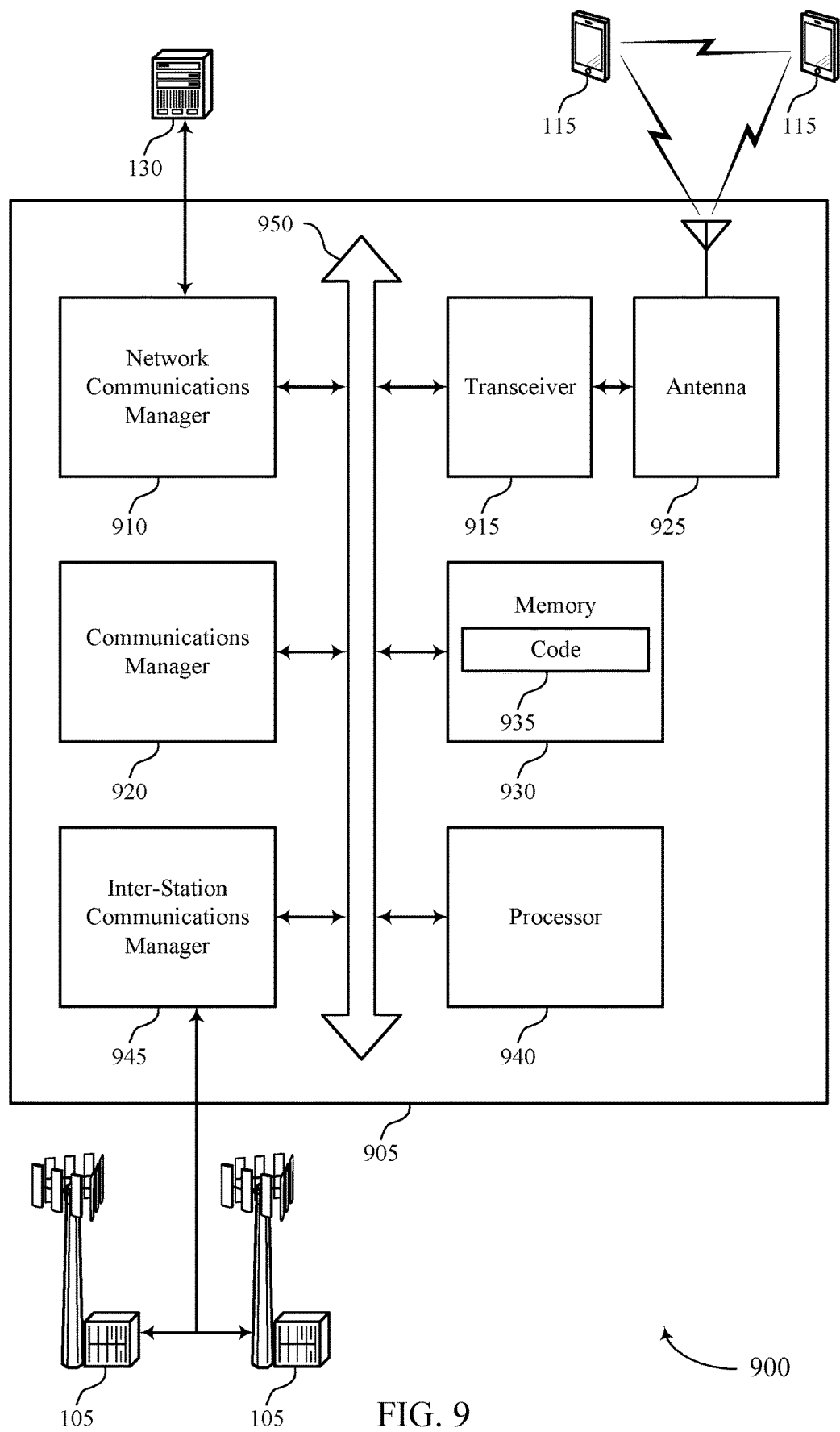
FIG. 9 shows a diagram of a system including a base station that supports relative beam direction indication for beam management in accordance with aspects of the present disclosure.

FIG. 9 shows a diagram of a system 900 including a device 905 that supports relative beam direction indication for beam management in accordance with aspects of the present disclosure. The device 905 may be an example of or include the components of a device 505, a device 605, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 515, a transmitter 615, a receiver 510, a receiver 610, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting relative beam direction indication for beam management). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communication at a first wireless device in accordance with examples as disclosed herein. For example, the communications manager 920 may be configured as or otherwise support a means for receiving, from a second wireless device, signaling indicating a first angular range of a set of angular ranges, where the set of angular ranges is associated with a set of transmit beams for the second wireless device, and where the first angular range corresponds to at least two transmit beams of the set of transmit beams. The communications manager 920 may be configured as or otherwise support a means for selecting, from among a set of receive beams for the first wireless device, a receive beam based on the first angular range. The communications manager 920 may be configured as or otherwise support a means for receiving, from the second wireless device, a reference signal using the selected receive beam as part of a beam management procedure. The communications manager 920 may be configured as or otherwise support a means for transmitting, to the second wireless device, beam information based on the reference signal.

Additionally or alternatively, the communications manager 920 may support wireless communication at a second wireless device in accordance with examples as disclosed herein. For example, the communications manager 920 may be configured as or otherwise support a means for transmitting, to a first wireless device, signaling a first angular range of a set of angular ranges, where the set of angular ranges is associated with a set of transmit beams for the second wireless device, and where the first angular range corresponds to at least two transmit beams of the set of transmit beams. The communications manager 920 may be configured as or otherwise support a means for transmitting, to the first wireless device, a reference signal using a transmit beam of the at least two transmit beams as part of a beam management procedure. The communications manager 920 may be configured as or otherwise support a means for receiving, from the second wireless device, beam information based on the reference signal.

By including or configuring the communications manager 920 in accordance with examples as described herein, the device 905 may support techniques for reduced power consumption and longer battery life.

In some examples, the communications manager 920 may be configured to perform various operations (e.g., receiving, monitoring, transmitting) using or otherwise in cooperation with the transceiver 915, the one or more antennas 925, or any combination thereof. For example, the communications manager 920 may be configured to receive or transmit messages or other signaling as described herein via the transceiver 915. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of relative beam direction indication for beam management as described herein, or the processor 940 and the memory 930 may be otherwise configured to perform or support such operations.

Figure 10:
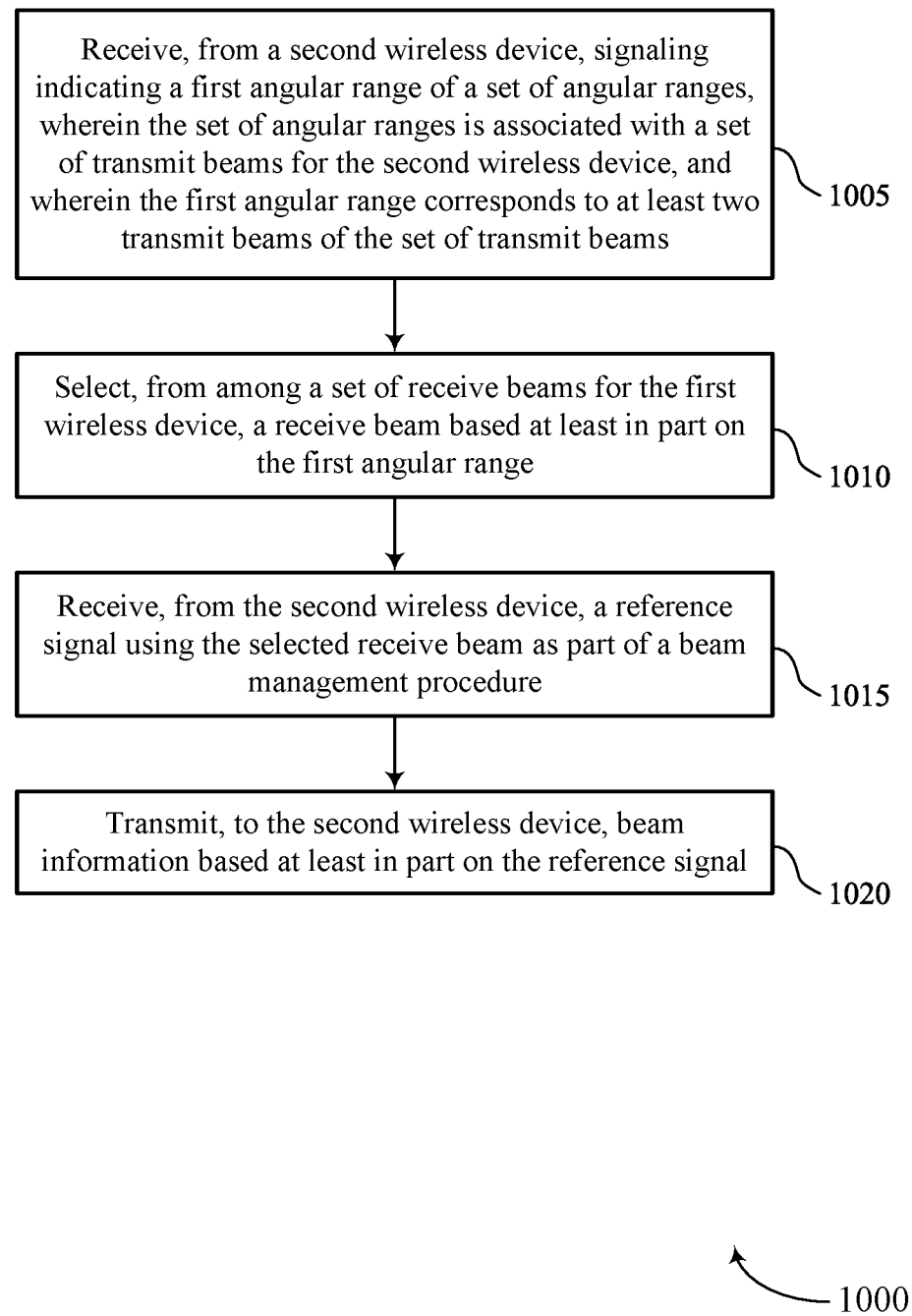
FIGS. 10 through 16 show flowcharts illustrating methods that support relative beam direction indication for beam management in accordance with aspects of the present disclosure.

FIG. 10 shows a flowchart illustrating a method 1000 that supports relative beam direction indication for beam management in accordance with aspects of the present disclosure. The operations of the method 1000 may be implemented by a UE or a base station or its components as described herein. For example, the operations of the method 1000 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware. A device that performs method 1000 may be referred to as a first wireless device.

At 1005, the method may include receiving, from a second wireless device, signaling indicating a first angular range of a set of angular ranges, where the set of angular ranges is associated with a set of transmit beams for the second wireless device, and where the first angular range corresponds to at least two transmit beams of the set of transmit beams. The operations of 1005 may be performed in accordance with examples as disclosed herein. In some examples, aspects of the operations of 1005 may be performed by a relative direction component 725 as described with reference to FIG. 7. Additionally or alternatively, means for performing 1005 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1010, the method may include selecting, from among a set of receive beams for the first wireless device, a receive beam based on the first angular range. The operations of 1010 may be performed in accordance with examples as disclosed herein. In some examples, aspects of the operations of 1010 may be performed by a beam selection component 730 as described with reference to FIG. 7. Additionally or alternatively, means for performing 1010 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1015, the method may include receiving, from the second wireless device, a reference signal using the selected receive beam as part of a beam management procedure. The operations of 1015 may be performed in accordance with examples as disclosed herein. In some examples, aspects of the operations of 1015 may be performed by a reference signal component 735 as described with reference to FIG. 7. Additionally or alternatively, means for performing 1015 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1020, the method may include transmitting, to the second wireless device, beam information based on the reference signal. The operations of 1020 may be performed in accordance with examples as disclosed herein. In some examples, aspects of the operations of 1020 may be performed by a beam information component 740 as described with reference to FIG. 7. Additionally or alternatively, means for performing 1020 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

Figure 11:
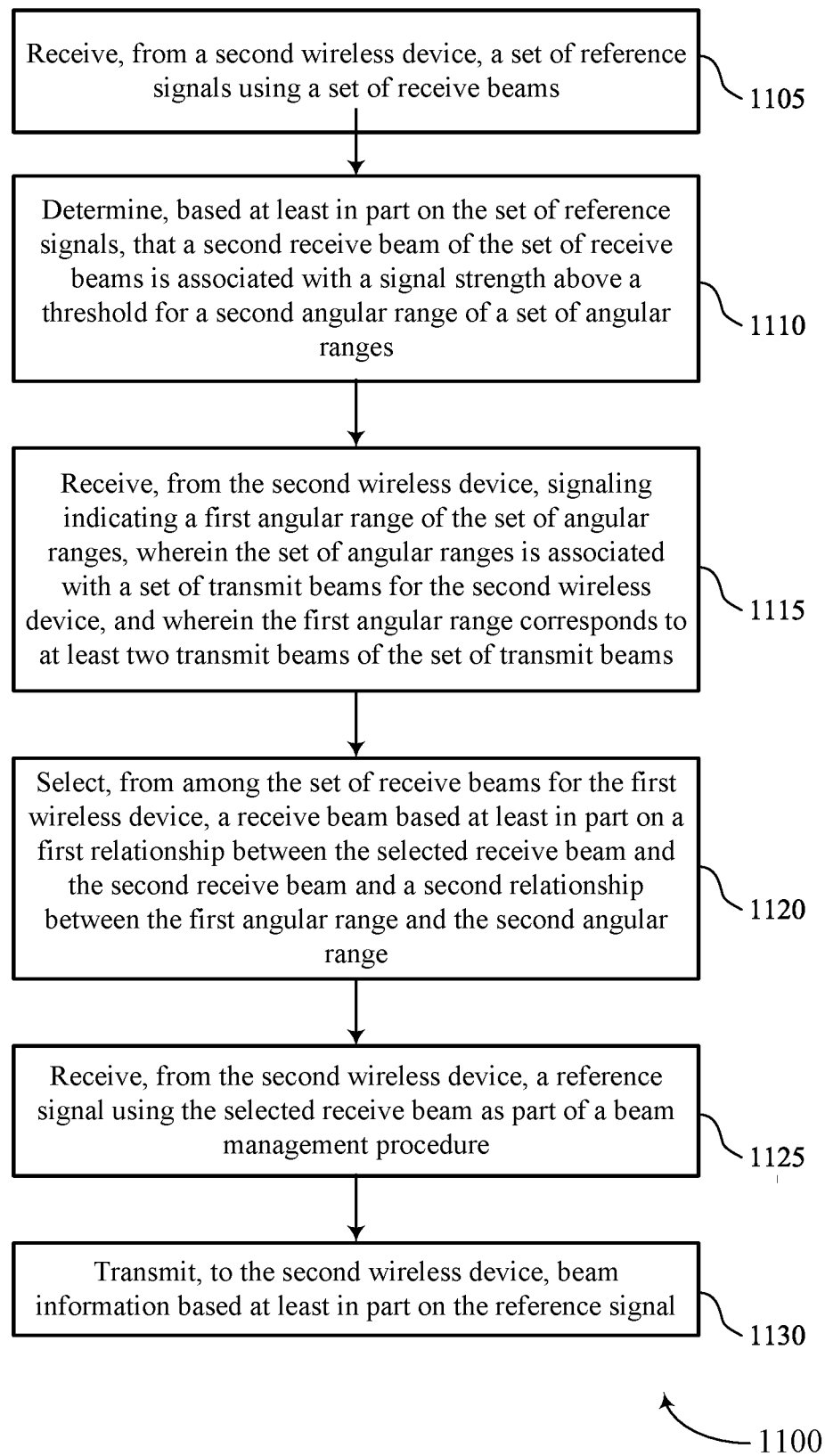

FIG. 11 shows a flowchart illustrating a method 1100 that supports relative beam direction indication for beam management in accordance with aspects of the present disclosure. The operations of the method 1100 may be implemented by a UE or a base station or its components as described herein. For example, the operations of the method 1100 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware. A device that performs method 1100 may be referred to as a first wireless device.

At 1105, the method may include receiving, from a second wireless device, a set of reference signals using a set of receive beams. The operations of 1105 may be performed in accordance with examples as disclosed herein. In some examples, aspects of the operations of 1105 may be performed by a reference signal component 735 as described with reference to FIG. 7. Additionally or alternatively, means for performing 1105 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1110, the method may include determining, based on the set of reference signals, that a second receive beam of the set of receive beams is associated with a signal strength above a threshold for a second angular range of a set of angular ranges. The operations of 1110 may be performed in accordance with examples as disclosed herein. In some examples, aspects of the operations of 1110 may be performed by a beam selection component 730 as described with reference to FIG. 7. Additionally or alternatively, means for performing 1110 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1115, the method may include receiving, from the second wireless device, signaling indicating a first angular range of the set of angular ranges, where the set of angular ranges is associated with a set of transmit beams for the second wireless device, and where the first angular range corresponds to at least two transmit beams of the set of transmit beams. The operations of 1115 may be performed in accordance with examples as disclosed herein. In some examples, aspects of the operations of 1115 may be performed by a relative direction component 725 as described with reference to FIG. 7. Additionally or alternatively, means for performing 1115 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1120, the method may include selecting, from among the set of receive beams for the first wireless device, a receive beam based on a first relationship between the selected receive beam and the second receive beam and a second relationship between the first angular range and the second angular range. The operations of 1120 may be performed in accordance with examples as disclosed herein. In some examples, aspects of the operations of 1120 may be performed by a beam selection component 730 as described with reference to FIG. 7. Additionally or alternatively, means for performing 1120 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1125, the method may include receiving, from the second wireless device, a reference signal using the selected receive beam as part of a beam management procedure. The operations of 1125 may be performed in accordance with examples as disclosed herein. In some examples, aspects of the operations of 1125 may be performed by a reference signal component 735 as described with reference to FIG. 7. Additionally or alternatively, means for performing 1125 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1130, the method may include transmitting, to the second wireless device, beam information based on the reference signal. The operations of 1130 may be performed in accordance with examples as disclosed herein. In some examples, aspects of the operations of 1130 may be performed by a beam information component 740 as described with reference to FIG. 7. Additionally or alternatively, means for performing 1130 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

Figure 12:
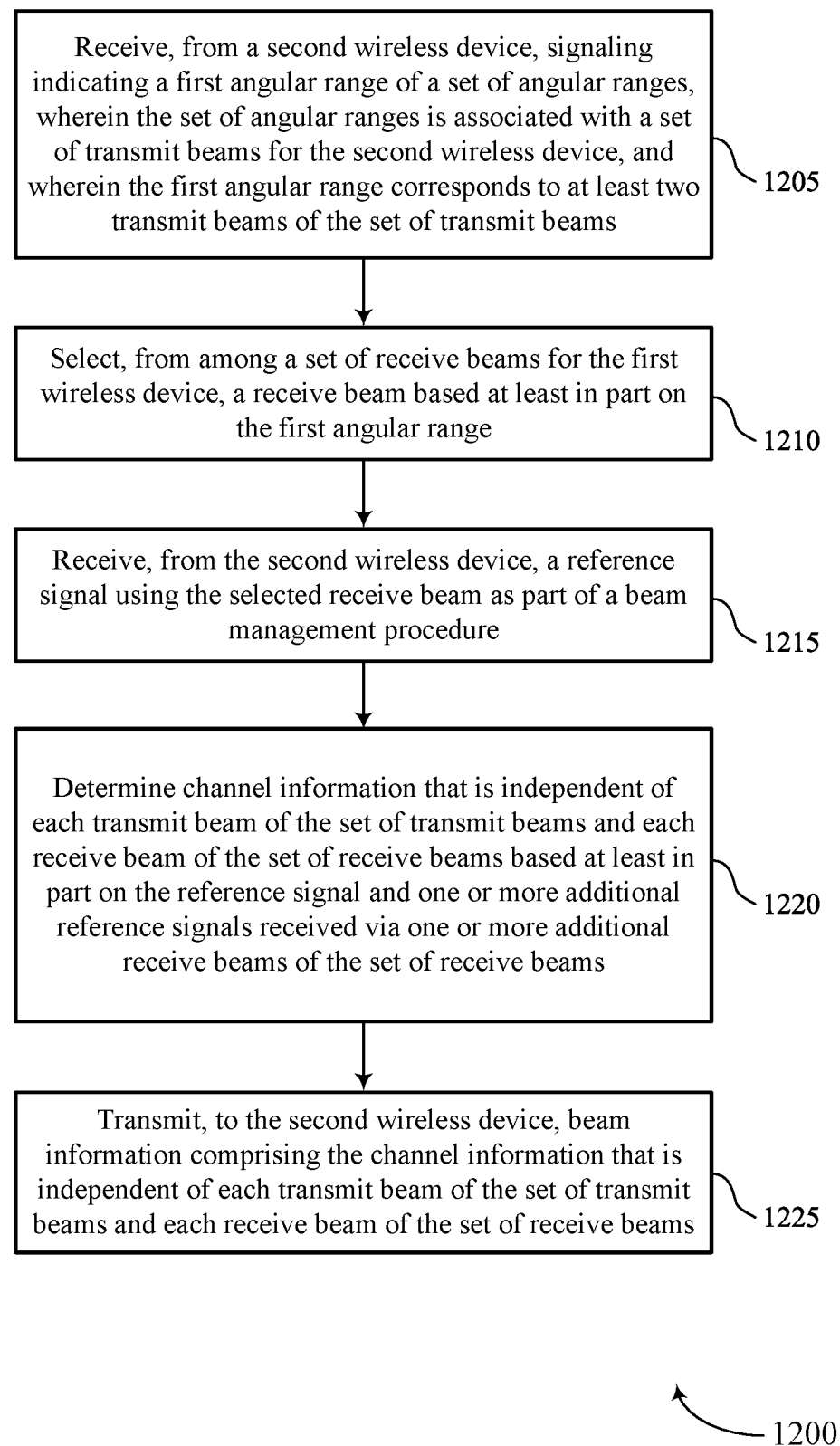

FIG. 12 shows a flowchart illustrating a method 1200 that supports relative beam direction indication for beam management in accordance with aspects of the present disclosure. The operations of the method 1200 may be implemented by a UE or a base station or its components as described herein. For example, the operations of the method 1200 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware. A device that performs method 1200 may be referred to as a first wireless device.

At 1205, the method may include receiving, from a second wireless device, signaling indicating a first angular range of a set of angular ranges, where the set of angular ranges is associated with a set of transmit beams for the second wireless device, and where the first angular range corresponds to at least two transmit beams of the set of transmit beams. The operations of 1205 may be performed in accordance with examples as disclosed herein. In some examples, aspects of the operations of 1205 may be performed by a relative direction component 725 as described with reference to FIG. 7. Additionally or alternatively, means for performing 1205 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1210, the method may include selecting, from among a set of receive beams for the first wireless device, a receive beam based on the first angular range. The operations of 1210 may be performed in accordance with examples as disclosed herein. In some examples, aspects of the operations of 1210 may be performed by a beam selection component 730 as described with reference to FIG. 7. Additionally or alternatively, means for performing 1210 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1215, the method may include receiving, from the second wireless device, a reference signal using the selected receive beam as part of a beam management procedure. The operations of 1215 may be performed in accordance with examples as disclosed herein. In some examples, aspects of the operations of 1215 may be performed by a reference signal component 735 as described with reference to FIG. 7. Additionally or alternatively, means for performing 1215 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1220, the method may include determining channel information that is independent of each transmit beam of the set of transmit beams and each receive beam of the set of receive beams based on the reference signal and one or more additional reference signals received via one or more additional receive beams of the set of receive beams. The operations of 1220 may be performed in accordance with examples as disclosed herein. In some examples, aspects of the operations of 1220 may be performed by a channel estimation component 750 as described with reference to FIG. 7. Additionally or alternatively, means for performing 1220 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1225, the method may include transmitting, to the second wireless device, beam information including the channel information that is independent of each transmit beam of the set of transmit beams and each receive beam of the set of receive beams. The operations of 1225 may be performed in accordance with examples as disclosed herein. In some examples, aspects of the operations of 1225 may be performed by a beam information component 740 as described with reference to FIG. 7. Additionally or alternatively, means for performing 1225 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

Figure 13:
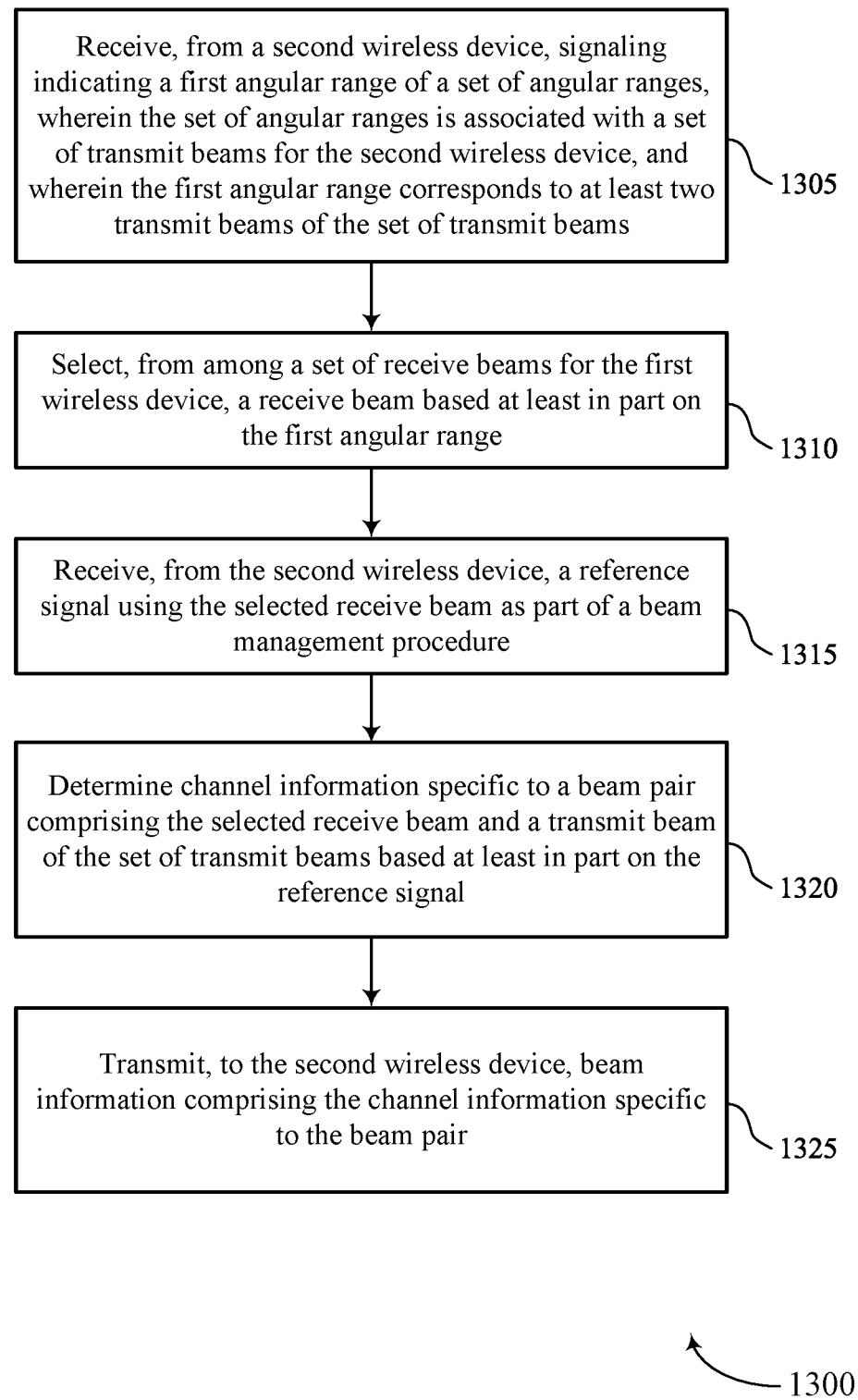

FIG. 13 shows a flowchart illustrating a method 1300 that supports relative beam direction indication for beam management in accordance with aspects of the present disclosure. The operations of the method 1300 may be implemented by a UE or a base station or its components as described herein. For example, the operations of the method 1300 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware. A device that performs method 1300 may be referred to as a first wireless device.

At 1305, the method may include receiving, from a second wireless device, signaling indicating a first angular range of a set of angular ranges, where the set of angular ranges is associated with a set of transmit beams for the second wireless device, and where the first angular range corresponds to at least two transmit beams of the set of transmit beams. The operations of 1305 may be performed in accordance with examples as disclosed herein. In some examples, aspects of the operations of 1305 may be performed by a relative direction component 725 as described with reference to FIG. 7. Additionally or alternatively, means for performing 1305 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1310, the method may include selecting, from among a set of receive beams for the first wireless device, a receive beam based on the first angular range. The operations of 1310 may be performed in accordance with examples as disclosed herein. In some examples, aspects of the operations of 1310 may be performed by a beam selection component 730 as described with reference to FIG. 7. Additionally or alternatively, means for performing 1310 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1315, the method may include receiving, from the second wireless device, a reference signal using the selected receive beam as part of a beam management procedure. The operations of 1315 may be performed in accordance with examples as disclosed herein. In some examples, aspects of the operations of 1315 may be performed by a reference signal component 735 as described with reference to FIG. 7. Additionally or alternatively, means for performing 1315 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1320, the method may include determining channel information specific to a beam pair including the selected receive beam and a transmit beam of the set of transmit beams based on the reference signal. The operations of 1320 may be performed in accordance with examples as disclosed herein. In some examples, aspects of the operations of 1320 may be performed by a channel estimation component 750 as described with reference to FIG. 7. Additionally or alternatively, means for performing 1320 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1325, the method may include transmitting, to the second wireless device, beam information including the channel information specific to the beam pair. The operations of 1325 may be performed in accordance with examples as disclosed herein.

In some examples, aspects of the operations of 1325 may be performed by a beam information component 740 as described with reference to FIG. 7. Additionally or alternatively, means for performing 1325 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

Figure 14:
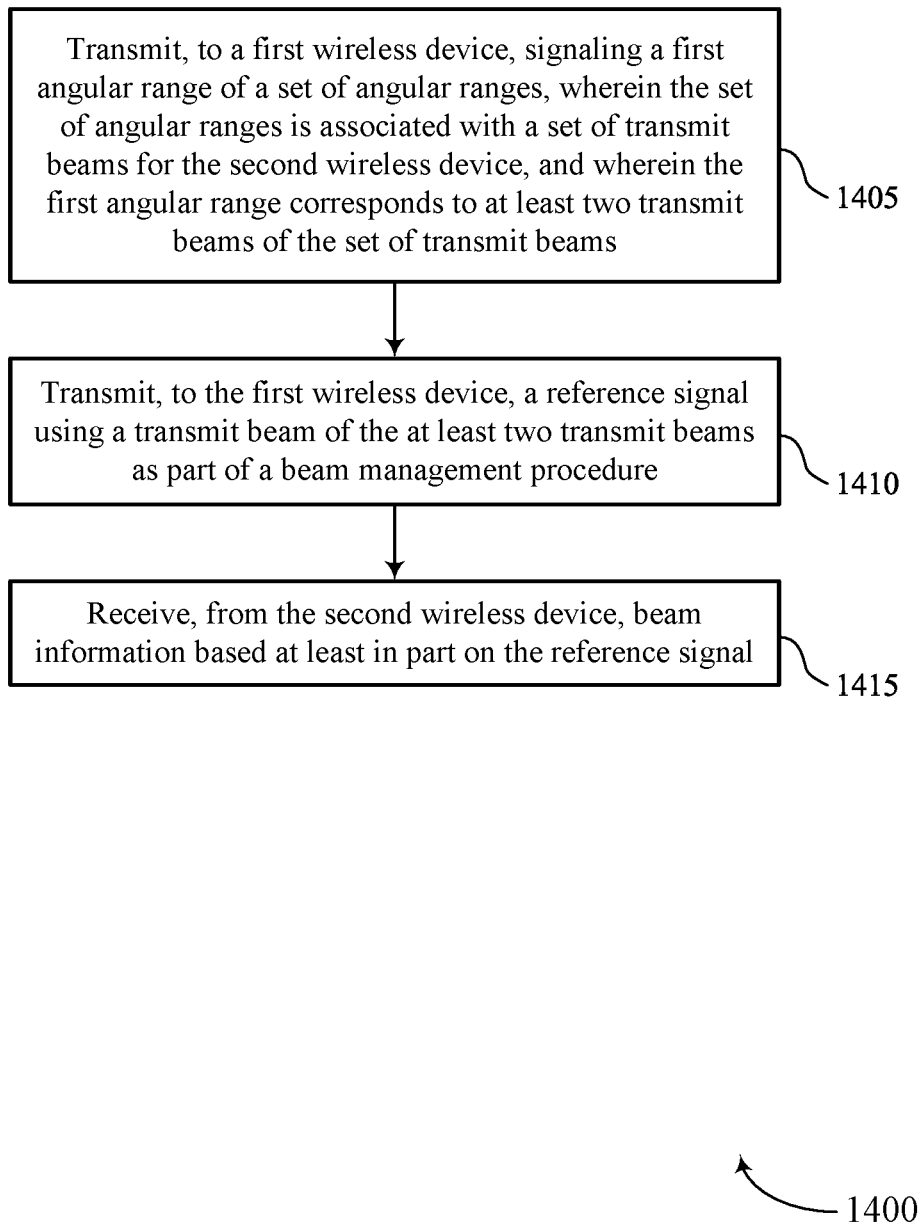

FIG. 14 shows a flowchart illustrating a method 1400 that supports relative beam direction indication for beam management in accordance with aspects of the present disclosure. The operations of the method 1400 may be implemented by a UE or a base station or its components as described herein. For example, the operations of the method 1400 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware. A device that performs method 1400 may be referred to as a second wireless device.

At 1405, the method may include transmitting, to a first wireless device, signaling a first angular range of a set of angular ranges, where the set of angular ranges is associated with a set of transmit beams for the second wireless device, and where the first angular range corresponds to at least two transmit beams of the set of transmit beams. The operations of 1405 may be performed in accordance with examples as disclosed herein. In some examples, aspects of the operations of 1405 may be performed by a relative direction component 725 as described with reference to FIG. 7. Additionally or alternatively, means for performing 1405 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1410, the method may include transmitting, to the first wireless device, a reference signal using a transmit beam of the at least two transmit beams as part of a beam management procedure. The operations of 1410 may be performed in accordance with examples as disclosed herein. In some examples, aspects of the operations of 1410 may be performed by a reference signal component 735 as described with reference to FIG. 7. Additionally or alternatively, means for performing 1410 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1415, the method may include receiving, from the second wireless device, beam information based on the reference signal. The operations of 1415 may be performed in accordance with examples as disclosed herein. In some examples, aspects of the operations of 1415 may be performed by a beam information component 740 as described with reference to FIG. 7. Additionally or alternatively, means for performing 1415 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

Figure 15:
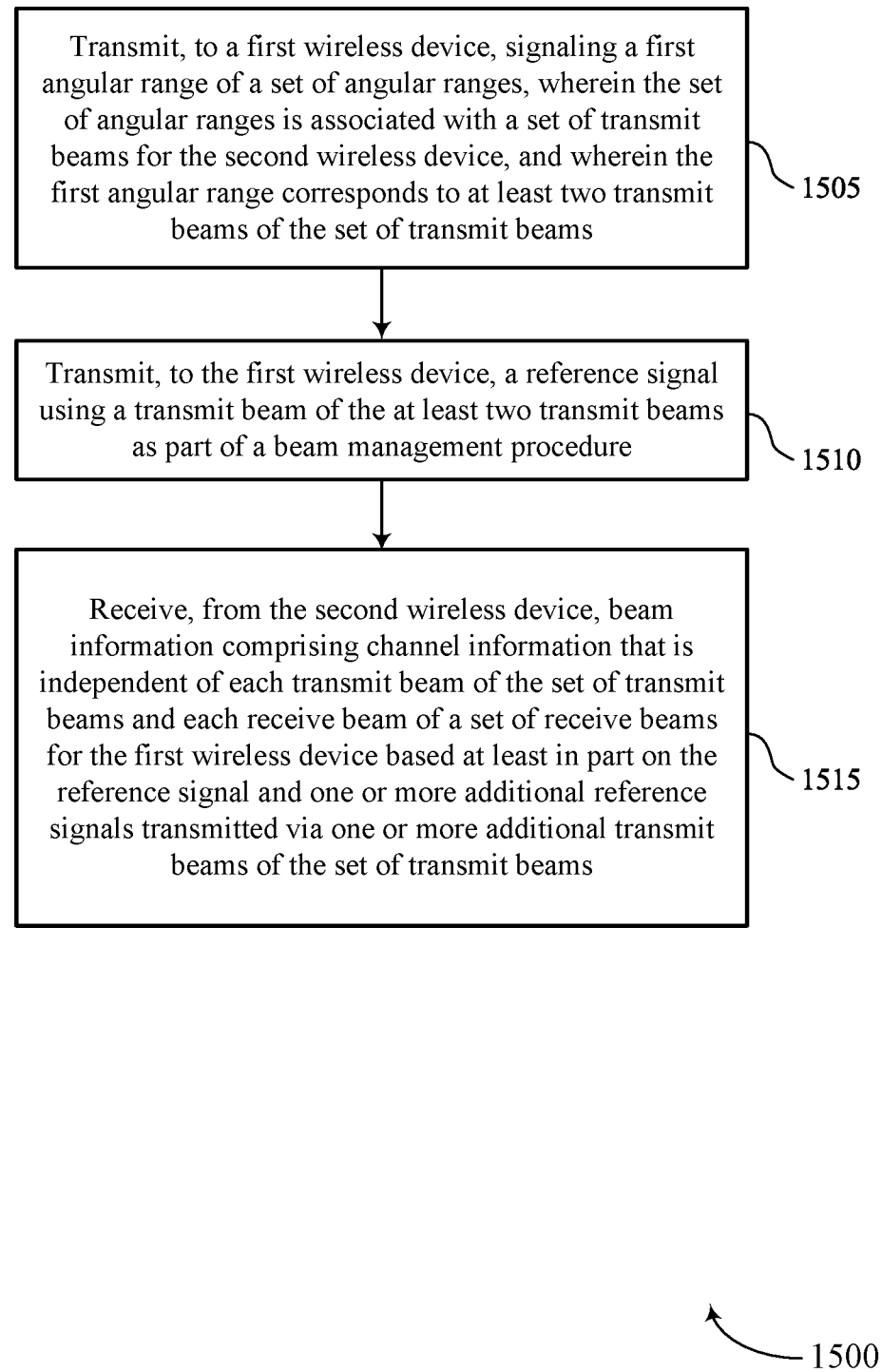

FIG. 15 shows a flowchart illustrating a method 1500 that supports relative beam direction indication for beam management in accordance with aspects of the present disclosure. The operations of the method 1500 may be implemented by a UE or a base station or its components as described herein. For example, the operations of the method 1500 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware. A device that performs method 1500 may be referred to as a second wireless device.

At 1505, the method may include transmitting, to a first wireless device, signaling a first angular range of a set of angular ranges, where the set of angular ranges is associated with a set of transmit beams for the second wireless device, and where the first angular range corresponds to at least two transmit beams of the set of transmit beams. The operations of 1505 may be performed in accordance with examples as disclosed herein. In some examples, aspects of the operations of 1505 may be performed by a relative direction component 725 as described with reference to FIG. 7. Additionally or alternatively, means for performing 1505 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1510, the method may include transmitting, to the first wireless device, a reference signal using a transmit beam of the at least two transmit beams as part of a beam management procedure. The operations of 1510 may be performed in accordance with examples as disclosed herein. In some examples, aspects of the operations of 1510 may be performed by a reference signal component 735 as described with reference to FIG. 7. Additionally or alternatively, means for performing 1510 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1515, the method may include receiving, from the second wireless device, beam information comprising channel information that is independent of each transmit beam of the set of transmit beams and each receive beam of a set of receive beams for the first wireless device based on the reference signal and one or more additional reference signals transmitted via one or more additional transmit beams of the set of transmit beams. The operations of 1515 may be performed in accordance with examples as disclosed herein. In some examples, aspects of the operations of 1515 may be performed by a beam information component 740 as described with reference to FIG. 7. Additionally or alternatively, means for performing 1515 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

Figure 16:
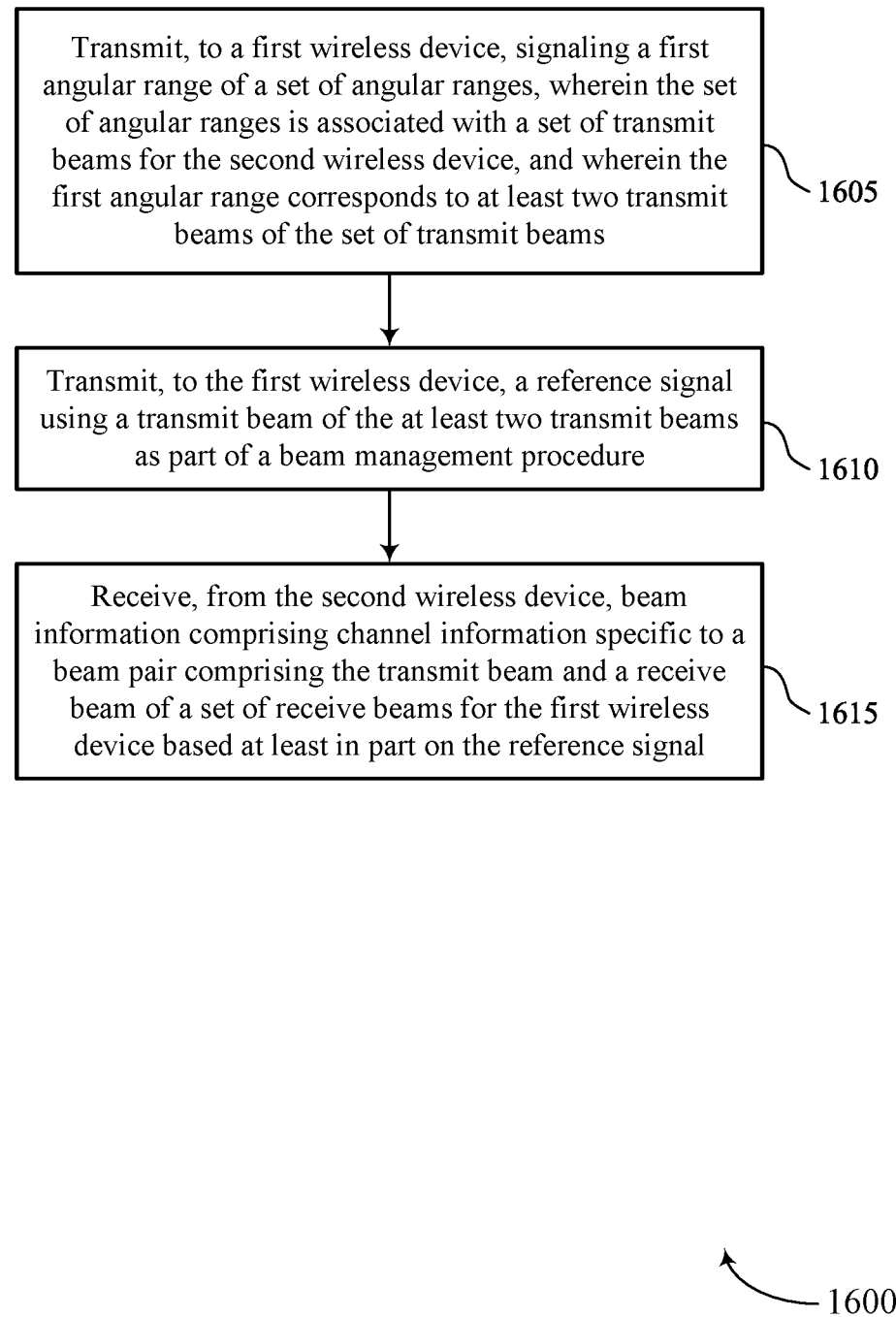

FIG. 16 shows a flowchart illustrating a method 1600 that supports relative beam direction indication for beam management in accordance with aspects of the present disclosure. The operations of the method 1600 may be implemented by a UE or a base station or its components as described herein. For example, the operations of the method 1600 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware. A device that performs method 1600 may be referred to as a second wireless device.

At 1605, the method may include transmitting, to a first wireless device, signaling a first angular range of a set of angular ranges, where the set of angular ranges is associated with a set of transmit beams for the second wireless device, and where the first angular range corresponds to at least two transmit beams of the set of transmit beams. The operations of 1605 may be performed in accordance with examples as disclosed herein. In some examples, aspects of the operations of 1605 may be performed by a relative direction component 725 as described with reference to FIG. 7. Additionally or alternatively, means for performing 1605 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1610, the method may include transmitting, to the first wireless device, a reference signal using a transmit beam of the at least two transmit beams as part of a beam management procedure. The operations of 1610 may be performed in accordance with examples as disclosed herein. In some examples, aspects of the operations of 1610 may be performed by a reference signal component 735 as described with reference to FIG. 7. Additionally or alternatively, means for performing 1610 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

At 1615, the method may include receiving, from the second wireless device, beam information including channel information specific to a beam pair including the transmit beam and a receive beam of a set of receive beams for the first wireless device based on the reference signal. The operations of 1615 may be performed in accordance with examples as disclosed herein. In some examples, aspects of the operations of 1615 may be performed by a beam information component 740 as described with reference to FIG. 7. Additionally or alternatively, means for performing 1615 may, but not necessarily, include, for example, antenna 825, antenna 925, transceiver 815, transceiver 915, communications manager 820, communications manager 920, memory 830 (including code 835), memory 930 (including code 935), processor 840, processor 940, bus 845, and/or bus 950.

The following provides an overview of aspects of the present disclosure:

Aspect 1: A method for wireless communication at a first wireless device, comprising: receiving, from a second wireless device, signaling indicating a first angular range of a set of angular ranges, wherein the set of angular ranges is associated with a set of transmit beams for the second wireless device, and wherein the first angular range corresponds to at least two transmit beams of the set of transmit beams; selecting, from among a set of receive beams for the first wireless device, a receive beam based at least in part on the first angular range; receiving, from the second wireless device, a reference signal using the selected receive beam as part of a beam management procedure; and transmitting, to the second wireless device, beam information based at least in part on the reference signal.

Aspect 2: The method of aspect 1, wherein the set of angular ranges spans a range of azimuth angles relative to an antenna panel of the second wireless device, a respective range of elevation angles relative to the antenna panel of the second wireless device, or both; and each angular range of the set of angular ranges spans a respective portion of the range of azimuth angles, a respective portion of the range of elevation angles, or both.

Aspect 3: The method of any of aspects 1 through 2, wherein receiving the signaling indicating the first angular range comprises: receiving a single indication that maps to a respective range of azimuth angles relative to an antenna panel of the second wireless device and to a respective range of elevation angles relative to the antenna panel of the second wireless device.

Aspect 4: The method of any of aspects 1 through 2, wherein receiving the signaling indicating the first angular range comprises: receiving a first indication that maps to a respective range of azimuth angles relative to an antenna panel of the second wireless device; and receiving a second indication that maps to a respective range of elevation angles relative to the antenna panel of the second wireless device.

Aspect 5: The method of any of aspects 1 through 4, further comprising: receiving, from the second wireless device and prior to the receiving the signaling indicating the first angular range, a set of reference signals using the set of receive beams; and determining, based at least in part on the set of reference signals, that a second receive beam of the set of receive beams is associated with a signal strength above a threshold for a second angular range of the set of angular ranges, wherein selecting the receive beam is based at least in part on a first relationship between the selected receive beam and the second receive beam and a second relationship between the first angular range and the second angular range.

Aspect 6: The method of any of aspects 1 through 5, further comprising: determining channel information that is independent of each receive beam of the set of receive beams and each transmit beam of the set of transmit beams based at least in part on the reference signal and one or more additional reference signals received via one or more additional receive beams of the set of receive beams, wherein transmitting the beam information comprises transmitting the channel information that is independent of each receive beam of the set of receive beams and each transmit beam of the set of transmit beams.

Aspect 7: The method of any of aspects 1 through 6, further comprising: determining channel information specific to a beam pair comprising the selected receive beam and a transmit beam of the set of transmit beams based at least in part on the reference signal, wherein transmitting the beam information comprises transmitting the channel information specific to the beam pair.

Aspect 8: The method of any of aspects 1 through 7, further comprising: receiving, from the second wireless device and prior to the receiving the signaling indicating the first angular range, a set of reference signals using at least a subset of the set of receive beams; determining, for a first location of the first wireless device associated with receiving the set of reference signals, an orientation of the first wireless device relative to the second wireless device, wherein selecting the receive beam is based at least in part on a relationship between the first location and a second location of the first wireless device associated with receiving the reference signal.

Aspect 9: The method of any of aspects 1 through 8, wherein the second wireless device comprises a base station; and the reference signal comprises a CSI-RS, one or more signals of an SSB, or any combination thereof.

Aspect 10: The method of aspect 9, wherein receiving the signaling indicating the first angular range comprises: receiving DCI, a MAC-CE, RRC signaling, or any combination thereof that indicates the first angular range.

Aspect 11: The method of any of aspects 1 through 8, wherein the second wireless device comprises a UE; and the reference signal comprises an SRS.

Aspect 12: The method of aspect 11, wherein receiving the signaling indicating the first angular range comprises: receiving UCI, a MAC-CE, RRC signaling, or any combination thereof that indicates the first angular range.

Aspect 13: A method for wireless communication at a second wireless device, comprising: transmitting, to a first wireless device, signaling a first angular range of a set of angular ranges, wherein the set of angular ranges is associated with a set of transmit beams for the second wireless device, and wherein the first angular range corresponds to at least two transmit beams of the set of transmit beams; transmitting, to the first wireless device, a reference signal using a transmit beam of the at least two transmit beams as part of a beam management procedure; and receiving, from the second wireless device, beam information based at least in part on the reference signal.

Aspect 14: The method of aspect 13, wherein the set of angular ranges spans a range of azimuth angles relative to an antenna panel of the second wireless device, a respective range of elevation angles relative to the antenna panel of the second wireless device, or both; and each angular range of the set of angular ranges spans a respective portion of the range of azimuth angles, a respective portion of the range of elevation angles, or both.

Aspect 15: The method of any of aspects 13 through 14, wherein transmitting the signaling indicating the first angular range comprises: transmitting a single indication that maps to a respective range of azimuth angles relative to an antenna panel of the second wireless device and to a respective range of elevation angles relative to the antenna panel of the second wireless device.

Aspect 16: The method of any of aspects 13 through 14, wherein transmitting the signaling indicating the first angular range comprises: transmitting a first indication that maps to a respective range of azimuth angles relative to an antenna panel of the second wireless device; and transmitting a second indication that maps to a respective range of elevation angles relative to the antenna panel of the second wireless device.

Aspect 17: The method of any of aspects 13 through 16, wherein receiving the beam information comprises: receiving, based at least in part on the reference signal and one or more additional reference signals transmitted via one or more additional transmit beams of the set of transmit beams, channel information that is independent of each transmit beam of the set of transmit beams and each receive beam of a set of receive beams for the first wireless device.

Aspect 18: The method of any of aspects 13 through 17, wherein receiving the beam information comprises: receiving, based at least in part on the reference signal, channel information specific to a beam pair comprising the transmit beam and a receive beam of a set of receive beams for the first wireless device.

Aspect 19: The method of any of aspects 13 through 18, wherein the second wireless device comprises a base station; and the reference signal comprises a CSI-RS signal, one or more signals of an SSB, or any combination thereof.

Aspect 20: The method of aspect 19, wherein transmitting the signaling indicating the first angular range comprises: transmitting DCI, a MAC-CE, RRC signaling, or any combination thereof that indicates the first angular range.

Aspect 21: The method of any of aspects 13 through 18, wherein the second wireless device comprises a UE; and the reference signal comprises an SRS.

Aspect 22: The method of aspect 21, wherein transmitting the signaling indicating the first angular range comprises: transmitting UCI, a MAC-CE, RRC signaling, or any combination thereof that indicates the first angular range.

Aspect 23: An apparatus for wireless communication at a first wireless device, comprising a processor; a transceiver coupled with the processor; memory coupled with the processor, the memory and the processor configured to cause the apparatus to perform a method of any of aspects 1 through 12.

Aspect 24: An apparatus for wireless communication at a first wireless device, comprising at least one means for performing a method of any of aspects 1 through 12.

Aspect 25: A non-transitory computer-readable medium storing code for wireless communication at a first wireless device, the code comprising instructions executable by a processor to perform a method of any of aspects 1 through 12.

Aspect 26: An apparatus for wireless communication at a second wireless device, comprising a processor; a transceiver coupled with the processor; memory coupled with the processor, the memory and the processor configured to cause the apparatus to perform a method of any of aspects 13 through 22.

Aspect 27: An apparatus for wireless communication at a second wireless device, comprising at least one means for performing a method of any of aspects 13 through 22.

Aspect 28: A non-transitory computer-readable medium storing code for wireless communication at a second wireless device, the code comprising instructions executable by a processor to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:
   receiving, from a second wireless device, signaling indicating a first angular range of a set of angular ranges, wherein the set of angular ranges is associated with a set of transmit beams for the second wireless device, and wherein the first angular range corresponds to at least a first transmit beam and a second transmit beam of the set of transmit beams;
selecting, from among a set of receive beams for the first wireless device and prior to performing a beam management procedure, a first receive beam based at least in part on a relationship between the indicated first angular range and the first receive beam;
receiving, from the second wireless device, a reference signal using the first receive beam as part of the beam management procedure; and
transmitting, to the second wireless device, beam information based at least in part on the reference signal.

2. The method of claim 1, wherein:
the set of angular ranges spans a range of azimuth angles relative to an antenna panel of the second wireless device, a respective range of elevation angles relative to the antenna panel of the second wireless device, or both; and
each angular range of the set of angular ranges spans a respective portion of the range of azimuth angles, a respective portion of the range of elevation angles, or both.

3. The method of claim 1, wherein receiving the signaling indicating the first angular range comprises:
receiving a single indication that maps to a respective range of azimuth angles relative to an antenna panel of the second wireless device and to a respective range of elevation angles relative to the antenna panel of the second wireless device.

4. The method of claim 1, wherein receiving the signaling indicating the first angular range comprises:
receiving a first indication that maps to a respective range of azimuth angles relative to an antenna panel of the second wireless device; and
receiving a second indication that maps to a respective range of elevation angles relative to the antenna panel of the second wireless device.

5. The method of claim 1, further comprising:
receiving, from the second wireless device and prior to the receiving the signaling indicating the first angular range, a set of reference signals using the set of receive beams; and
determining, based at least in part on the set of reference signals, that the second receive beam of the set of receive beams is associated with a signal strength above a threshold for a second angular range of the set of angular ranges, wherein selecting the first receive beam is based at least in part on a first relationship between the first receive beam and the second receive beam and a second relationship between the first angular range and the second angular range.

6. The method of claim 1, further comprising:
determining channel information that is independent of each receive beam of the set of receive beams and each transmit beam of the set of transmit beams based at least in part on the reference signal and one or more additional reference signals received via one or more additional receive beams of the set of receive beams, wherein transmitting the beam information comprises transmitting the channel information that is independent of each receive beam of the set of receive beams and each transmit beam of the set of transmit beams.

7. The method of claim 1, further comprising:
determining channel information specific to a beam pair comprising the first receive beam and a transmit beam of the set of transmit beams based at least in part on the reference signal, wherein transmitting the beam information comprises transmitting the channel information specific to the beam pair.

8. The method of claim 1, further comprising:
receiving, from the second wireless device and prior to the receiving the signaling indicating the first angular range, a set of reference signals using at least a subset of the set of receive beams; and
determining, for a first location of the first wireless device associated with receiving the set of reference signals, an orientation of the first wireless device relative to the second wireless device, wherein selecting the first receive beam is based at least in part on a relationship between the first location and a second location of the first wireless device associated with receiving the reference signal.

9. The method of claim 1, wherein:
the second wireless device comprises a network device; and
the reference signal comprises a channel state information reference signal, one or more signals of a synchronization signal block, or any combination thereof.

10. The method of claim 9, wherein receiving the signaling indicating the first angular range comprises:
receiving downlink control information, a medium access control-control element, radio resource control signaling, or any combination thereof that indicates the first angular range.

11. The method of claim 1, wherein:
the second wireless device comprises a user equipment (UE); and
the reference signal comprises a sounding reference signal.

12. The method of claim 11, wherein receiving the signaling indicating the first angular range comprises:
receiving uplink control information, a medium access control-control element, radio resource control signaling, or any combination thereof that indicates the first angular range.

13. A method for wireless communication at a second wireless device, comprising:
selecting a first transmit beam of a set of transmit beams for the second wireless device to use for performing a subsequent beam management procedure;
transmitting, to a first wireless device, signaling indicating a first angular range of a set of angular ranges, wherein the set of angular ranges is associated with the set of transmit beams for the second wireless device, and wherein the first angular range corresponds to at least the first transmit beam and a second transmit of the set of transmit beams;
transmitting, to the first wireless device, a reference signal using the first transmit beam of the set of transmit beams as part of the beam management procedure; and
receiving, from the first wireless device, beam information corresponding to at least the first transmit beam and a first receive beam for the first wireless device based at least in part on the reference signal and a relationship between the indicated first angular range and the first receive beam.

14. The method of claim 13, wherein:
the set of angular ranges spans a range of azimuth angles relative to an antenna panel of the second wireless device, a respective range of elevation angles relative to the antenna panel of the second wireless device, or both; and each angular range of the set of angular ranges spans a respective portion of the range of azimuth angles, a respective portion of the range of elevation angles, or both.

15. The method of claim 13, wherein transmitting the signaling indicating the first angular range comprises:
transmitting a single indication that maps to a respective range of azimuth angles relative to an antenna panel of the second wireless device and to a respective range of elevation angles relative to the antenna panel of the second wireless device.

16. The method of claim 13, wherein transmitting the signaling indicating the first angular range comprises:
transmitting a first indication that maps to a respective range of azimuth angles relative to an antenna panel of the second wireless device; and
transmitting a second indication that maps to a respective range of elevation angles relative to the antenna panel of the second wireless device.

17. The method of claim 13, wherein receiving the beam information comprises:
receiving, based at least in part on the reference signal and one or more additional reference signals transmitted via one or more additional transmit beams of the set of transmit beams, channel information that is independent of each transmit beam of the set of transmit beams and each receive beam of a set of receive beams for the first wireless device.

18. The method of claim 13, wherein receiving the beam information comprises:
receiving, based at least in part on the reference signal, channel information specific to a beam pair comprising the first transmit beam and the first receive beam of a set of receive beams for the first wireless device.

19. The method of claim 13, wherein:
the second wireless device comprises a network device; and
the reference signal comprises a channel state information reference signal, one or more signals of a synchronization signal block, or any combination thereof.

20. The method of claim 19, wherein transmitting the signaling indicating the first angular range comprises:
transmitting downlink control information, a medium access control-control element, radio resource control signaling, or any combination thereof that indicates the first angular range.

21. The method of claim 13, wherein:
the second wireless device comprises a user equipment (UE); and
the reference signal comprises a sounding reference signal.

22. The method of claim 21, wherein transmitting the signaling indicating the first angular range comprises:
transmitting uplink control information, a medium access control-control element, radio resource control signaling, or any combination thereof that indicates the first angular range.

23. An apparatus for wireless communication at a first wireless device, comprising:
a processor of the first wireless device;
a transceiver coupled with the processor; and
memory coupled with the processor, the memory and the processor configured to cause the apparatus to:
receive, via the transceiver and from a second wireless device, signaling indicating a first angular range of a set of angular ranges, wherein the set of angular ranges is associated with a set of transmit beams for the second wireless device, and wherein the first angular range corresponds to at least a first transmit beam and a second transmit beam of the set of transmit beams;
select, from among a set of receive beams for the first wireless device and prior to performing a beam management procedure, a first receive beam based at least in part on a relationship between the indicated first angular range and the first receive beam;
receive, via the transceiver and from the second wireless device, a reference signal using the first receive beam as part of the beam management procedure; and
transmit, via the transceiver and to the second wireless device, beam information based at least in part on the reference signal.

24. The apparatus of claim 23, wherein:
the set of angular ranges spans a range of azimuth angles relative to an antenna panel of the second wireless device, a respective range of elevation angles relative to the antenna panel of the second wireless device, or both; and
each angular range of the set of angular ranges spans a respective portion of the range of azimuth angles, a respective portion of the range of elevation angles, or both.

25. The apparatus of claim 23, the memory and the processor further configured to cause the apparatus to:
receive, from the second wireless device and prior to the receiving the signaling indicating the first angular range, a set of reference signals using the set of receive beams; and
determine, based at least in part on the set of reference signals, that the second receive beam of the set of receive beams is associated with a signal strength above a threshold for a second angular range of the set of angular ranges, wherein selecting the first receive beam is based at least in part on a first relationship between the first receive beam and the second receive beam and a second relationship between the first angular range and the second angular range.

26. The apparatus of claim 23, the memory and the processor further configured to cause the apparatus to:
determine channel information that is independent of each receive beam of the set of receive beams and each transmit beam of the set of transmit beams based at least in part on the reference signal and one or more additional reference signals received via one or more additional receive beams of the set of receive beams, wherein transmitting the beam information comprises transmitting the channel information that is independent of each receive beam of the set of receive beams and each transmit beam of the set of transmit beams.

27. The apparatus of claim 23, the memory and the processor further configured to cause the apparatus to:
determine channel information specific to a beam pair comprising the first receive beam and a transmit beam of the set of transmit beams based at least in part on the reference signal, wherein transmitting the beam information comprises transmitting the channel information specific to the beam pair.

28. An apparatus for wireless communication at a second wireless device, comprising:
a processor of the second wireless device;
a transceiver coupled with the processor; and
memory coupled with the processor, the memory and the processor configured to cause the apparatus to:

select a first transmit beam of a set of transmit beams for the second wireless device to use for performing a subsequent beam management procedure;

transmit, to a first wireless device, signaling indicating a first angular range of a set of angular ranges, wherein the set of angular ranges is associated with the set of transmit beams for the second wireless device, and wherein the first angular range corresponds to at least the first transmit beam and a second transmit beam of the set of transmit beams;

transmit, to the first wireless device, a reference signal using the first transmit beam of the set of transmit beams as part of the beam management procedure; and receive, from the first wireless device, beam information corresponding to at least the first transmit beam and a first receive beam for the first wireless device based at least in part on the reference signal and a relationship between the indicated first angular range and the first receive beam.

29. The apparatus of claim 28, the memory and the processor further configured to cause the apparatus to:

receive, based at least in part on the reference signal and one or more additional reference signals transmitted via one or more additional transmit beams of the set of transmit beams, channel information that is independent of each transmit beam of the set of transmit beams and each receive beam of a set of receive beams for the first wireless device.

30. The apparatus of claim 28, the memory and the processor further configured to cause the apparatus to:

receive, based at least in part on the reference signal, channel information specific to a beam pair comprising the first transmit beam and the first receive beam of a set of receive beams for the first wireless device.

* * * * *